United States Patent

Suzuki et al.

[11] Patent Number: 5,920,045
[45] Date of Patent: Jul. 6, 1999

[54] ACCELERATION DETECTING DEVICE

[75] Inventors: Kyojiro Suzuki, Kariya; Keiji Nagura, Okazaki; Sadayuki Kuwahara, Bisai, all of Japan

[73] Assignee: Nippondenso Co., Ltd., Kariya, Japan

[21] Appl. No.: 08/496,199

[22] Filed: Jun. 28, 1995

[30] Foreign Application Priority Data

| Jun. 29, 1994 | [JP] | Japan | 6-172138 |
| Dec. 12, 1994 | [JP] | Japan | 6-332627 |
| Jan. 25, 1995 | [JP] | Japan | 7-030073 |
| Feb. 23, 1995 | [JP] | Japan | 7-035411 |
| Mar. 1, 1995 | [JP] | Japan | 7-042058 |
| Mar. 24, 1995 | [JP] | Japan | 7-091861 |

[51] Int. Cl.$^6$ ................................................. H01H 35/14
[52] U.S. Cl. ................................. 200/61.45 R; 200/61.48
[58] Field of Search ..................... 200/61.45 R–61.45 M

[56] References Cited

U.S. PATENT DOCUMENTS

| 3,961,145 | 6/1976 | Halbeck | 200/155 A |
| 4,188,517 | 2/1980 | Narita et al. | 200/61.45 R |
| 4,362,913 | 12/1982 | Kumita et al. | 200/61.45 R |
| 4,496,809 | 1/1985 | Faust et al. | 200/61.45 R |
| 4,980,526 | 12/1990 | Reneau | 200/61.45 M |
| 5,005,861 | 4/1991 | Breed et al. | 280/734 |
| 5,012,050 | 4/1991 | Sewell | 200/61.45 R |
| 5,034,580 | 7/1991 | Tada et al. | 200/61.45 R |
| 5,178,410 | 1/1993 | Thuen et al. | 280/734 |
| 5,192,838 | 3/1993 | Breed et al. | 280/61.45 R |
| 5,233,141 | 8/1993 | Breed | 200/61.45 R |
| 5,393,944 | 2/1995 | Manandhar et al. | 200/61.45 R |
| 5,477,428 | 12/1995 | Brown et al. | 362/80 |

FOREIGN PATENT DOCUMENTS 2-168525  6/1990  Japan ............................. H01H 35/14

*Primary Examiner*—Michael L. Gellner
*Assistant Examiner*—Michael A. Friedhofer
*Attorney, Agent, or Firm*—Cushman, Darby & Cushman IP Group of Pillsbury Madison & Sutro LLP

[57] ABSTRACT

A weight (4) rotates with a shaft (5) as a rotational center during acceleration detection. A rotor (1) fixed on the weight (4) rotates integrally therewith. A first cam portion 1a of noncircular configuration on the rotor (1) contacts a plate spring (2) and a second cam portion (1b) of semicircular configuration contacts a plate spring (3), urging constantly the rotor (1) in a direction opposite to rotation direction thereof. The plate springs (2) and (3) have a contact-point function, and when the rotor (1) rotates in resistance to urging force thereof, contact is made with a contact points (2a) and (3a) on the plate springs (2) and (3) due to action of the first cam portion (1a) and second cam portion (1b), and the contacting state thereof is detected via a plate (6) and plate (7) as an electrical signal.

21 Claims, 19 Drawing Sheets

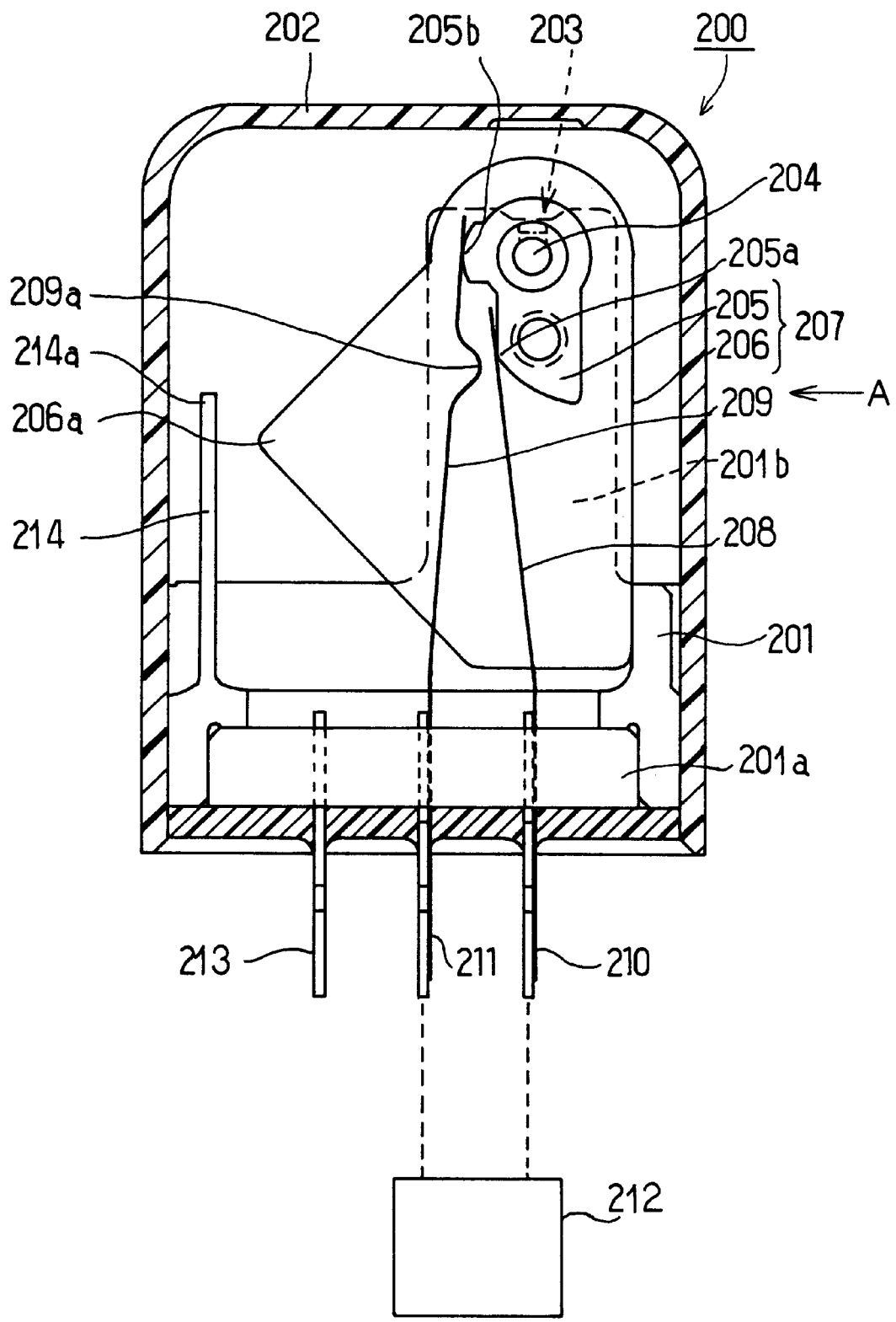

ACCELERATION DETECTING DEVICE

CROSS REFERENCE TO RELATED APPLICATION

This application is based upon and claims priority from Japanese Patent Applications No. Hei. 6-172138 filed Jun. 29, 1994, No. Hei. 6-332627 filed Dec. 12, 1994, No. Hei. 7-30073 filed Jan. 25, 1995, No. Hei. 7-35411 filed Feb. 23, 1995, No. Hei. 7-42058 filed Mar. 1, 1995, and No. Hei. 7-91861 filed Mar. 24, 1995, the contents of which are incorporated herein by reference.

BACKGROUND OF THE INVENTION

1. Field of the Invention

This invention relates to an acceleration detecting device which is a device to detect acceleration of an object and that is favorable for sensing the collision of a vehicle and causing the activation of passenger protection apparatus such as an airbag.

2. Related Art

Conventionally known devices mechanically assess acceleration information by a rotor with a weight center of gravity and an eccentric rotational center and output an external electrical signal by a contact which rotates integrally with the rotor, (as seen in Japanese Patent Application Laid-open No. Hei. 2-168525 Patent Gazette). In this case, a single function is assigned to each part: the rotor rotates due to acceleration, a spring urges the rotor to prevent operation at times other than acceleration action, and the contact relays an electrical signal output of the rotation of the rotor.

However, assigning a single function to every part causes the number of parts and mechanical connections to increase. Additionally, assurance of the spacing of contact points is structurally difficult, and so there exist problems of a lack of stability in quality, and an inability to make the acceleration detecting device compact and lightweight.

Additionally, in a case where an acceleration detecting device is applied in an airbag apparatus, it is necessary to send signals to the driver seat side, passenger seat side, and the like, and so a plurality of independent electrical signals may be output in some cases. There exists two possible methods for this: (i) dividing the acquired electrical signal, and (ii) using two or more devices. However, the first method requires a transistor and constant-current circuit as an accessory system, resulting in complexity and high cost. In the second method, cost is not only at least doubled, but it is difficult to obtain electrical signals having identical characteristics. Therefore, problems exist with either method.

In addition, in a case where a casing of an acceleration detecting device is formed with resin material, assembly performance during press-fitting is poor. In particular, there is a problem in which damage such as splitting of the cover occurs in the case of press-fitting with the cover remaining tilted.

SUMMARY OF THE INVENTION

Consequently, it is an object of the present invention to provide an acceleration detecting device which reduces a number of parts and reduces mechanical connections by assigning a plurality of functions to a single part and thereby makes a compact and lightweight acceleration detecting device possible.

It is another object of the present invention to provide an acceleration detecting device which adequately assures spacing of contact points structurally to raise stability of quality.

It is still another object of the present invention to provide an acceleration detecting device which is able to easily output a plurality of independent electrical signals.

Additionally, it is another object to provide an acceleration detecting device with good casing assembly performance which does not produce damage such as splitting of a cover.

To solve the above-described problems, an acceleration detecting device according to the present invention comprises:

a weight to rotate in correspondence with acceleration;

a shaft which is fixed to the weight and becomes a rotational center when the weight rotates;

a rotor on which a cam portion is formed, to rotate integrally with the weight;

a pair of plate springs disposed with a predetermined gap interposed therebetween, where a tip portion of at least one plate spring contacts the rotor cam portion and urges the rotor in a direction opposite to a direction of rotation of the rotor, and the plate spring contacting the cam portion is moved so as to contact the other plate spring; and first and second connection terminals to which the pair of plate springs are respectively connected and for which electrical conduction is protected by contact of the pair of plate springs.

According to the above-described structure, the pair of plate springs are provided with two functions: a function of urging the rotor which rotates integrally with the weight in a direction opposite to a direction of rotation due to acceleration at a time other than acceleration action, and a function of outputting a contact state of the contact points thereof to an external portion due to narrowing of the gap and contact through action of the cam portion of the rotor by rotation of the rotor. For this reason, the number of parts of the device can be limited, and a compact and lightweight acceleration detecting device becomes possible.

The cam portion is configured so that the amount of displacement of the plate springs which are in contact with the cam during rotation of the rotor is reduced after contact of the contact point of the pair of plate springs. Because of this, a degree of acceleration at which the contact points of the pair of plate springs make contact can be maintained at a uniform level, and characteristics of the acceleration detecting device can be stabilized, with no fatigue of the plate springs.

It is also acceptable to structure the cam portion formed on the rotor by two cams, i.e., a first cam portion and a second cam portion, and cause the pair of plate springs to contact the respective cam surfaces to urge them in a direction opposite to the direction of rotation of the rotor due to acceleration. Through this, a contact-point gap of the pair of plate springs can be reliably ensured, and there is no contact of the contact points due to vibration and slight acceleration acting on the rotor.

Additionally, by providing two or more pairs of plate springs, it is possible to have a plurality of contact points and easily obtain a plurality of independent electrical signals.

Furthermore, by providing a slit on the tip portion of the plate springs, even if foreign matter or the like has adhered to one tip portion, contact of the other is possible, and reliability of the device can be improved.

In particular, in a case where two pairs of plate springs are provided, the dynamic balance of the device can be improved by arranging the cam portion and plate springs on both sides of the weight.

In a case where the acceleration detecting device is structured with a housing and cover, after positioning the housing and cover and performing loose provisional assembly as an initial stage of fitting of the housing then cover, and the housing and cover are press-fitted as a second stage of fitting. Through this, the provisional assembly of the housing and cover is loosely made, and so provisional assembly can be performed easily, and work performance of assembly improves.

In addition, because of a first fitting portion formed on at least one of the housing and cover functions as a guide, assembly of the housing and cover is stabilized. That is to say, there is no press-fitting with the cover remaining tilted with respect to the housing, and so there is no occurrence of damage such as splitting of the cover.

In a case where the housing of the acceleration detecting device is fixed to a substrate, a terminal for installation use protruding from an outer peripheral surface of the housing is provided, and a through-hole on the substrate is passed through by this terminal for installation use. At this time, the length to a notch portion from a contact portion to the substrate of the terminal for installation use is made to be shorter than a plate thickness of the substrate. Through this, the notch portion of the terminal for installation use can be disposed in an internal portion of the through-hole of the substrate when the contact portion of the terminal for installation use has contacted one surface of the substrate.

Because of this, when a force parallel to the substrate surface is applied with respect to the terminal for installation use which has passed through the substrate and has protruded to the side of the other surface of the substrate, the terminal for installation use is bent at the notch portion, and a side-surface portion of the terminal for installation use contacts a side surface of the through-hole, and the terminal for installation use can apply a load in the direction of plate thickness of the substrate and in the radial direction of the through-hole. For this reason, the substrate can be tightly squeezed by a bent portion and the contact portion of the terminal for installation use, and the acceleration detecting device can be fixed to the substrate.

Accordingly, assembly accuracy of the acceleration detecting device can be improved and work performance of assembly can also be improved with no occurrence of play between the acceleration detecting device and the substrate, even in a case where the plate thickness of the terminal for installation use is thin.

Additionally, it is preferred that the above-described notch portion be formed adjacently to the contact portion. In this case, the position of the notch portion of the terminal for installation use can be disposed at an upper end of the through-hole of the substrate when the contact portion of the terminal for installation use has been contacted at one side of the substrate.

Because of this, when force is applied in a direction parallel to the substrate surface with respect to the terminal for installation use protruding to a side of the other surface of the substrate, the side-surface portion of the terminal for installation use reliably contacts the side surface of the through-hole, and the substrate can be firmly squeezed by the bent portion and the contact portion of the terminal for installation use and fixing of the acceleration detecting device and the substrate can be performed.

Furthermore, it is also acceptable to dispose a shock-reducing member on the housing or cover. In this case, the shock-reducing member acts on the weight and can reduce the rotation moment thereof, i.e., shock where the weight bumps against the shock-reducing member can be reduced, there is no separation (switching off) of the contact points of the pair of plate springs due to the shock.

Consequently, a stabilized acceleration detecting signal can be output, and so acceleration can be detected with good accuracy.

Additionally, it is also preferable to form a plurality of slits of differing length on an least one of the contact-point portions of the pair of plate springs. In this case, one contact-point portion assumes a form of separation into a plurality of contact-point portions of differing length.

That is to say, because the characteristic vibration frequency of a plate spring differs according to spring length of the plate spring, even if one plate spring resonates and separates from the contact point due to shock, the other plate spring does not resonate and so does not separate from the contact point.

Consequently, a stabilized acceleration detecting signal can be output, and acceleration can be detected with good accuracy.

Moreover, it is preferable for the shaft which becomes the rotational center of the weight to be supported at both ends thereof by bearings within the housing. When both ends of the shaft are supported on bearings within the housing, the rotor is rotated with the shaft as the rotational center, and so the shaft does not jiggle when the rotor rotates.

Consequently, acceleration and the centrifugal force of the rotor are accurately proportional, and so acceleration can be detected with good accuracy.

Additionally, by forming a narrow-diameter portion having a diameter which is narrower than the diameter of the shaft in the press-fitting path until the shaft reaches the bearing portion, prevention of displacement of the shaft press-fitted through the narrow-diameter portion into the bearing position can be promoted.

In particular, displacement prevention can be strengthened when a displacement-prevention member is inserted into the press-fitting path to the bearing portion into which the shaft is press-fitted.

Furthermore, if the two ends of the shaft are made so as to contact the bottoms of groove portions of the housing as the bearing portions, fall-in to an inner side of the housing can be prevented, and strength of the housing can be improved.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 23 is a front structural diagram indicating a structure of an acceleration detecting device according to a twelfth embodiment;

DETAILED DESCRIPTION OF THE PREFERRED EMBODIMENTS

The present invention will be described hereinafter with reference to specific embodiments.

Figure 1:
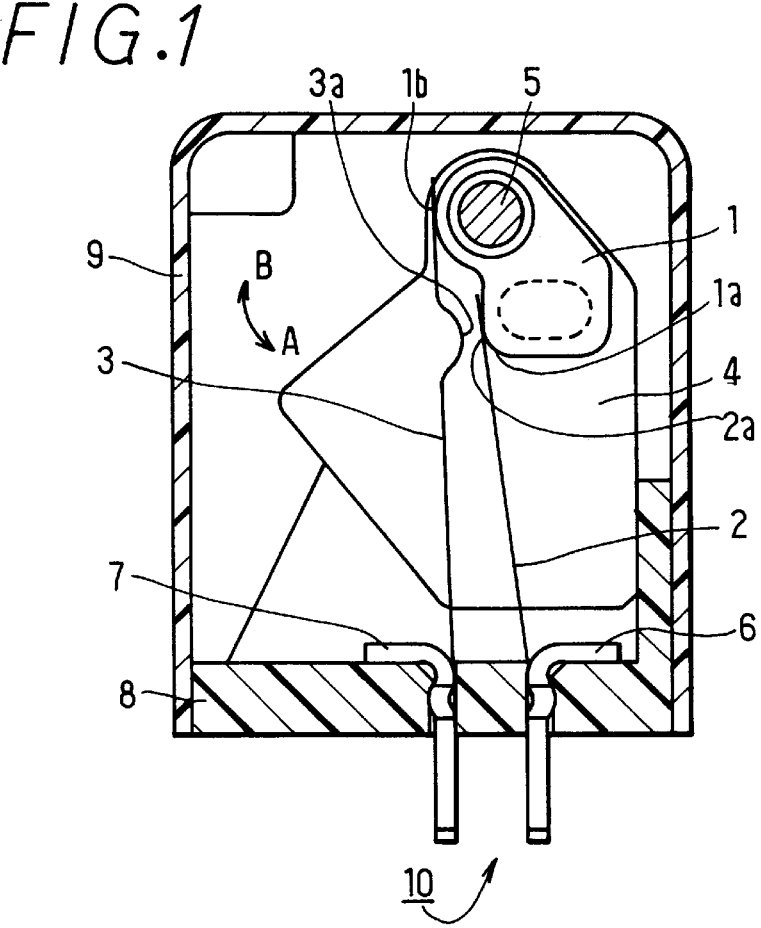
FIG. 1 is a front view indicating a structure of an acceleration detecting device according to a first embodiment of the present invention.
Figure 2:
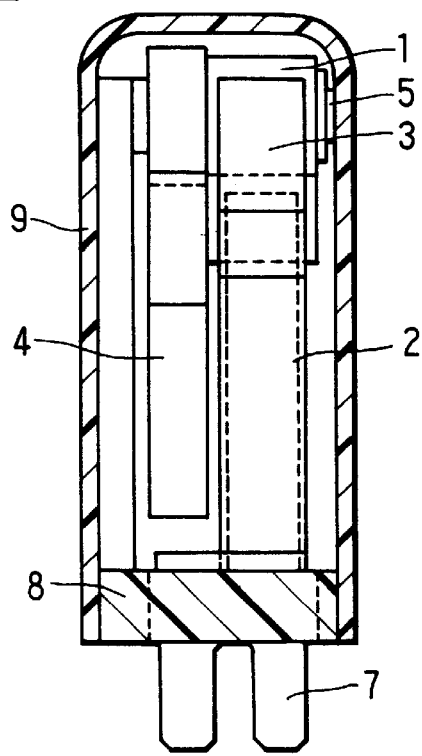
FIG. 2 is a left-hand view indicating a structure of an acceleration detecting device according to the first embodiment of the present invention.
Figure 3:
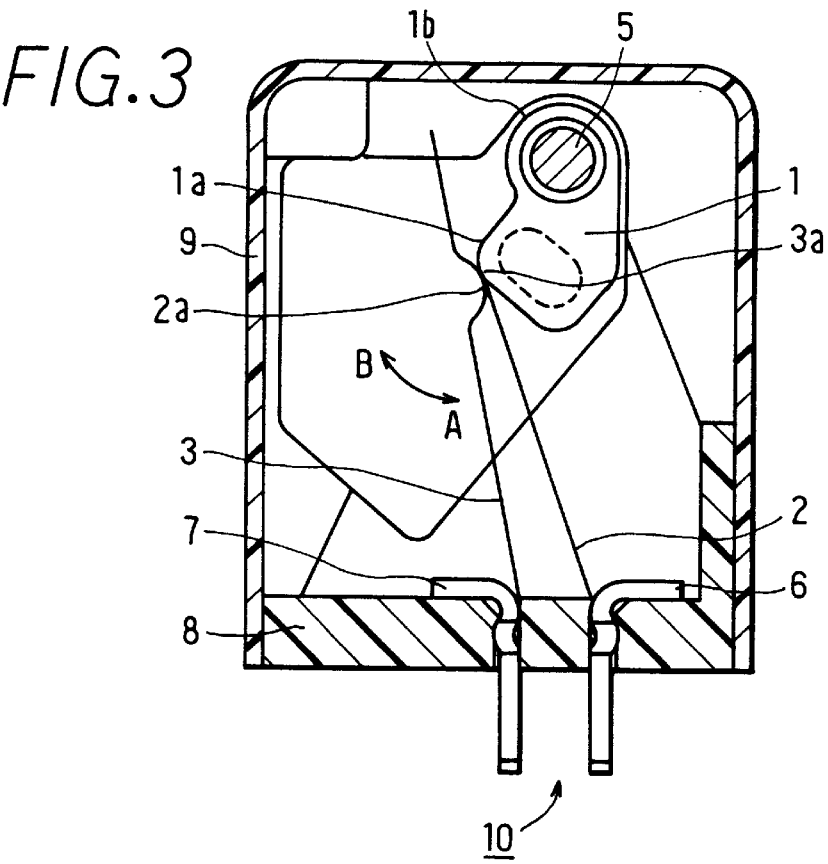
FIG. 3 is a front view indicating an operating state of an acceleration detecting device according to the first embodiment of the present invention.

FIG. 1 is a front view illustrating a structure of an acceleration detecting device 10 according to the first embodiment. FIG. 2 is a left-hand view of FIG. 1. FIG. 3 is a front view of a state wherein the acceleration detecting device 10 has detected acceleration and been actuated.

The acceleration detecting device 10 is structured from a shaft 5; a weight 4 where a center of gravity and rotational center are not co-axial and which rotates around the shaft 5 during acceleration detection; a rotor 1 on which a first cam 1a and a second cam 1b are formed, is fixed on the weight 4, has a rotational axis identical to the weight 4, and rotates integrally with the weight 4 during acceleration detection; a plate spring 2 and a plate spring 3 which are a pair of plate springs having a contact point 2a and a contact point 3a and which respectively contact the first cam surface and second cam surface and urge the rotor 1 in a direction opposite to a direction of rotation during acceleration detection; a plate 6 and a plate 7 which respectively contact the plate spring 2 and plate spring 3 and output an electrical signal to an external portion during contact of the contact point 2a and contact point 3a; a housing 8 which fixedly disposes the shaft 5, plate 6, and plate 7; and a cover 9 to protect the device.

The housing 8 is made of synthetic resin or the like, and a groove is formed on a lower area to fix the plate 6 of metal fabrication and the plate spring 2 of metal fabrication as well as the plate 7 of metal fabrication and the plate spring 3 of metal fabrication. The plate 6 and plate spring 2 and the plate 7 and plate spring 3 may be formed inserted into the housing 8. Additionally, bearings are formed on an upper portion of the housing 8, and the shaft 5 of metal fabrication is press-fitted and fixed in the bearings.

The plate spring 2 and plate spring 3 both have an upper tip portion functioning as a contact-point, i.e., are respectively provided with a contact point 2a and contact point 3a. In particular, the contact point 3a is made to have a protruding configuration to make the contact-point function effectively. The plate spring 2 contacts the plate 6 and the plate spring 3 contacts the plate 7, and both are fixed to the housing 8. Contact of the contact point 2a and the contact point 3a is detected by electrical signals due to change in resistance between the plate 6 and the plate 7. The electrical signals may be output directly from the plate spring 2 and the plate spring 3.

The shaft 5 supports the weight 4 of metal fabrication and the rotor 1 of nonmetal fabrication which has a rotational axis identical to the weight 4, and rotates integrally with the weight 4.

Because a shaft hole is provided configurationally on a peripheral portion, the weight 4 has an eccentric center of gravity and rotational center, and when subjected to acceleration, a moment is applied to the center of gravity, and the weight 4 rotates around the shaft 5.

The first cam 1a of noncircular configuration and the second cam 1b of semicircular configuration are formed on the rotor 1 of nonmetal fabrication. The tip portion of the plate spring 2 contacts the first cam 1a and the tip portion of the plate spring 3 contacts the second cam 1b, and constantly urge the rotor 1 in a direction opposite to the direction of rotation during acceleration detection. For this reason, when the acceleration detecting device is mounted on a vehicle to detect acceleration corresponding to a vehicle collision, the rotor 1 does not move when subjected to only slight acceleration of a vehicle.

Displacement of the contact point 2a of the plate spring 2 due to the first cam 1a is greater than displacement of the contact point 3a of the plate spring 3 due to the second cam 1b, and so when the rotor 1 is rotated by being subject to acceleration, the gap between the contact point 2a and contact point 3a gradually narrows, and ultimately the contact point 2a of the plate spring 2 pressed by the first cam 1a contacts the contact point 3a of the plate spring 3 in the direction of rotation due to the pressing.

Additionally, because the gap between the first cam 1a and second cam 1b is adequate, the plate spring 2 and plate spring 3 constantly urge the rotor 1 in a direction A of FIG. 1 and so the gap between the contact point 2a and contact point 3a is maintained with no fluctuation, and there is no contact due for example to vehicle vibration or the like except when a predetermined acceleration has been detected.

The cover 9 of synthetic resin is fixed to the housing 8 by press-fitting, and is also made to function as a stopper so that the weight 4 does not rotate excessively during acceleration detection.

Because the center of gravity and rotational center of the weight 4 are eccentric, deceleration (negative acceleration) is produced in a case where a vehicle or the like suddenly arrives at a stop from a traveling state, as during a collision, and a moment occurs in the center of gravity due to the law of inertia, and so the weight 4 rotates with the shaft 5 as the center during application of acceleration.

Due to rotation of the weight 4, the rotor 1 fixed on the weight 4 and having the same shaft 5 as the weight rotates integrally with the weight 4.

Because the plate spring 2 contacts the tip portion of the first cam 1a and the plate spring 3 contacts the tip portion of the second cam 1b at this time, they are respectively displaced together with rotation of the rotor 1. At this time, the amount of displacement due to the first cam 1a is larger, and so the gap between the contact point 2a of the plate spring 2 and the contact point 3a of the plate spring 3 narrows, and ultimately the contact point 2a of the plate spring 2 pressed by the first cam 1a contacts the contact point 3a of the plate spring 3 in the direction of rotation due to the pressing.

This contacting state of the contact point 2a and contact point 3a is output as an electrical signal via the plate spring 2 and the plate spring 3 and via the plate 6 and the plate 7 to an external portion, application of acceleration of a predetermined value or more is detected.

Additionally, the plate spring 2 and the plate spring 3 urge the rotor 1 in a direction A of FIG. 1, which is the direction opposite to the rotational direction of the rotor 1 during acceleration detection, by their respective tip portions. For this reason, reaction of the weight 4 during slight acceleration occurring during normal travel without a collision can be blocked through the rotor 1, and detection of other than vehicle collisions can be prevented. Furthermore, the respective tip portions of the plate spring 2 and the plate spring 3 are in contact with the first cam 1a and second cam 1b and the gap between the first cam 1a and second cam 1b is sufficient, and so the gaps of the contact points can be adequately ensured, and erroneous detection can be prevented with no fluctuation in the positions of the contact point 2a and contact point 3a due to vibration or the like.

A second embodiment will be described next with reference to FIG. 4.

Figure 4:
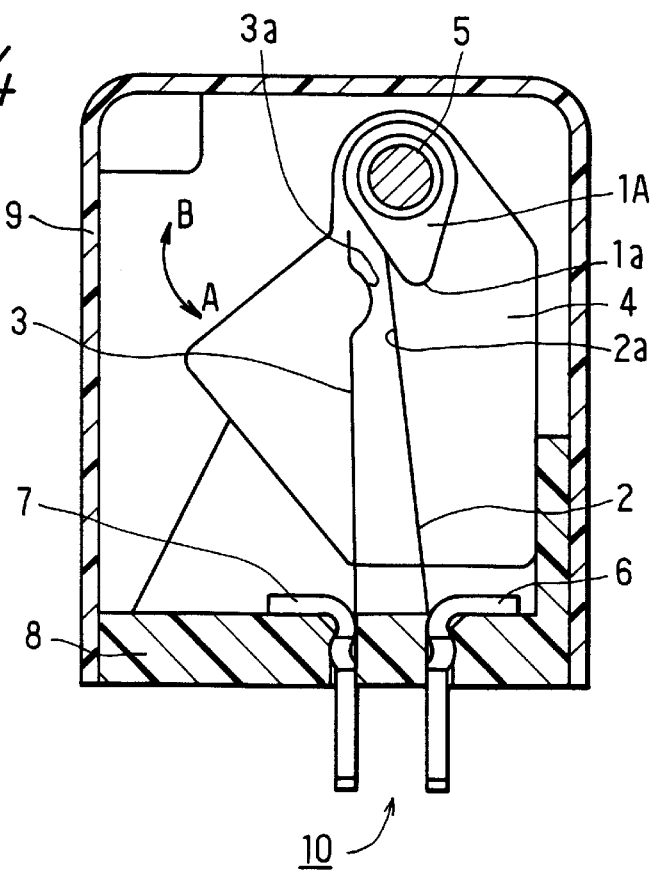
FIG. 4 is a front view indicating a structure of an acceleration detecting device according to a second embodiment of the present invention, which has a rotor of single-cam structure.

FIG. 4 is a front view of a second embodiment where a rotor has a single-cam structure by causing one of a pair of plate springs to urge the rotor in a direction opposite to a rotational direction thereof during acceleration detection.

A rotor 1A has a single-cam structure and a tip portion of a plate spring 2 urges a cam 1a. A plate spring 3 does not contact the rotor 1A. Support by a housing 8, cover 9, or the like so that a tip portion of the plate spring 3 does not fluctuate due to vibration or the like during traveling is also acceptable.

In this case, the tip portion of the plate spring 3 is not displaced due to rotation of the rotor 1, but the tip portion of the plate spring 2 is displaced by action of the cam 1a in direction B of FIG. 4, which is the direction of rotation, the gap between a contact point 2a of the plate spring 2 and a contact point 3a of the plate spring 3 narrows, and ultimately contact is reached by the contact point 2a of the plate spring 2 pressing the contact point 3a of the plate spring 3 in direction B. Accordingly, the contacting state between the contact points is output as an electrical signal to an external portion via a plate 6 and a plate 7. The electrical signal may be output directly from the plate spring 2 and the plate spring 3.

To continue, a third embodiment will be described with reference to FIGS. 5 and 6.

Figure 5:
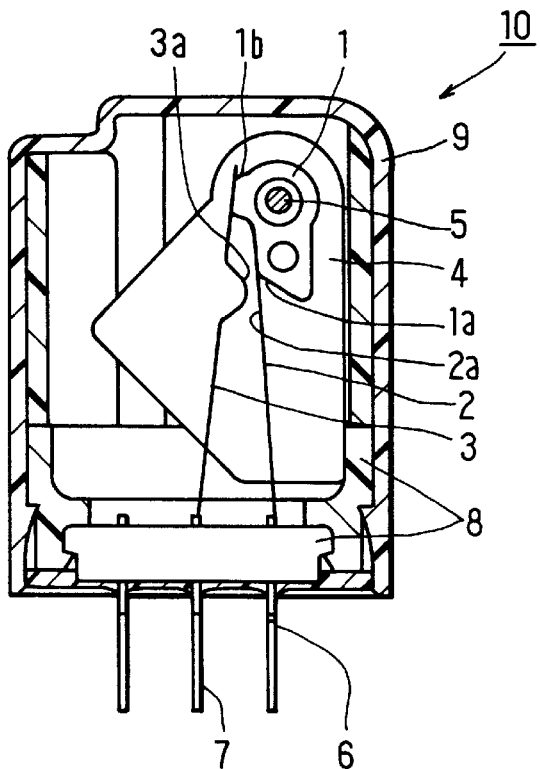
FIG. 5 is a front view of an acceleration detecting device according to a third embodiment of the present invention, indicating a structure of an acceleration detecting device having a first cam of a configuration which reduces contact-point displacement against rotation of a rotor after contact-point contact.

FIG. 5 is a front view indicating the structure of a third embodiment according to the present invention.

The present embodiment, similarly to the first embodiment, has a double-cam structure forming a first cam 1a and second cam 1b on a rotor 1; the difference between the first embodiment and the third embodiment lies in the configuration of the first cam 1a.

Namely, according to the first embodiment the first cam 1a is configured so that displacement of the contact point 2a of the plate spring 2 increases linearly along with rotation of the rotor 1. According to the present embodiment, however, the first cam 1a is configured to reduce displacement of a contact point 2a along with rotation of the rotor 1 after contact of the contact point 2a and a contact point 3a.

Figure 6:
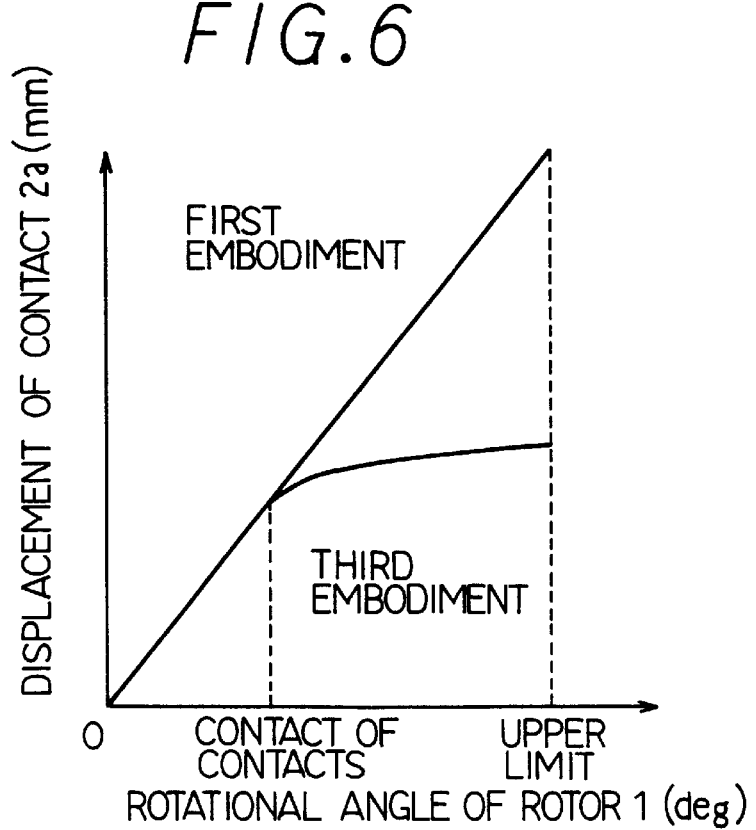
FIG. 6 is a graph indicating a relationship between amount of rotor rotation and contact-point displacement in an acceleration detecting device according to the third embodiment of the present invention.

FIG. 6 indicates a relationship between a rotational angle (deg) of the rotor 1 and an amount of displacement of the contact point 2a of the plate spring 2 in the first embodiment and the present embodiment. According to the first embodiment, the amount of displacement of the contact point 2a increases linearly until the rotational upper limit of the rotor 1 is reached after contact of the contact point 2a and the contact point 3a, but according to the present embodiment, the amount of displacement of the contact point 2a is small after contact of the contact point 2a and the contact point 3a.

Consequently, by adopting the above-described structure the amount of displacement of the contact point 2a is small after contact of the contact point 2a and the contact point 3a, and so there is no great flexing of the plate spring 2 and plate spring 3. Accordingly, because spring fatigue accompanying flexing does not occur, the activation level of the acceleration detecting device 10 due to acceleration can be maintained at a uniform level, and stabilized characteristics of the acceleration detecting device 10 can be obtained.

Additionally, when the first cam 1a has a configuration as indicated in the first embodiment, the amount of displacement of the contact point 2a increases linearly, and so it was necessary to restrict the rotational angle of the rotor 1 and weight 4 so that the elastic limit of the plate spring 2 and plate spring 3 is not exceeded. According to the present embodiment, however, the amount of displacement of the contact point 2a is small after contact of the contact point 2a and contact point 3a, and so a large rotational angle of the rotor 1 and weight 4 can be obtained, and the flexibility of design can be improved.

A fourth embodiment will be described hereinafter with reference to FIG. 7.

Figure 7:
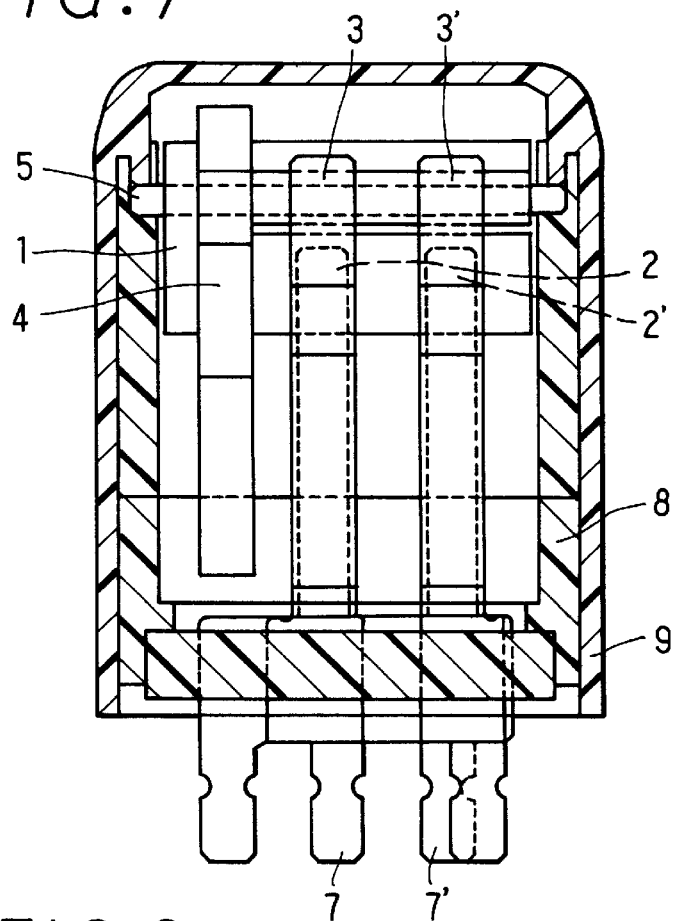
FIG. 7 is a front view indicating a structure of an acceleration detecting device according to a fourth embodiment of the present invention, which has two pairs of plate springs.
Figure 8:
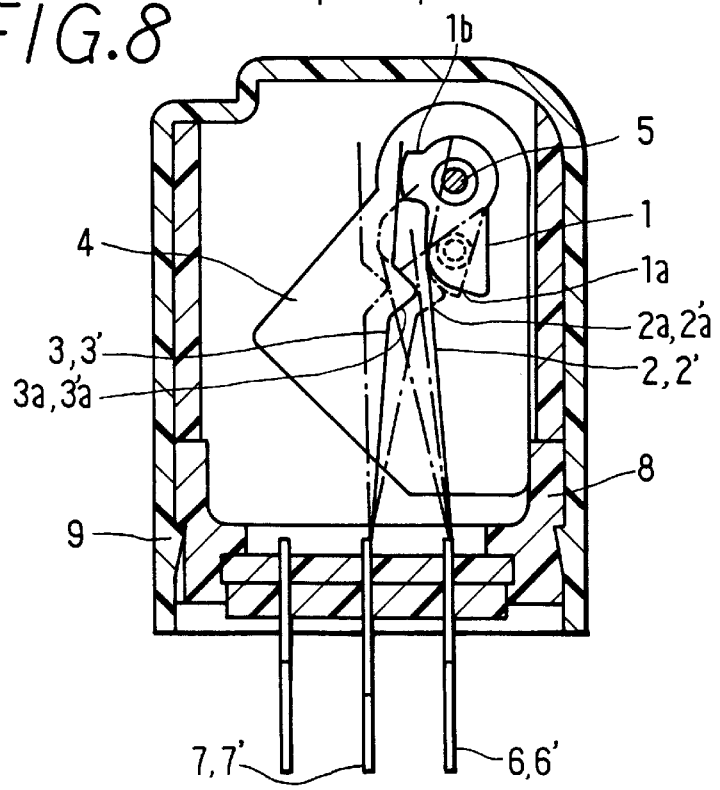
FIG. 8 is a right-hand view indicating a structure of an acceleration detecting device according to the fourth embodiment of the present invention, which has two pairs of plate springs.

FIG. 7 is a front view indicating the structure of a fourth embodiment, and FIG. 8 indicates a right-hand view thereof.

A difference with the third embodiment is the point that in addition to a plate spring 2 and plate spring 3, a plate spring 2' and plate spring 3' are provided, and in addition to a plate 6 and plate 7 to transmit a contacting state of the plate spring 2 and plate spring 3 to an external portion as an electric signals, a plate 6' and plate 7' to transmit a contacting state of the plate spring 2' and plate spring 3' to an external portion as electric signals are disposed. A groove disposed on a lower area of a housing 8 is structured to be able to fix the plate spring 2' and plate spring 3' and the plate 6' and plate 7' in addition to the plate spring 2 and plate spring 3 and the plate 6 and plate 7.

The plate spring 2' and plate spring 3' as well as the plate 6' and plate 7' may have an insert formation in the housing 8.

The plate spring 2' and plate spring 3' are of the same size and formed of the same material as the plate spring 2 and plate spring 3; a contact point 2'a and contact point 3'a are provided respectively on upper tip portions, and a gap between the contact point 2'a and contact point 3'a has a structure equivalent to a gap between the contact point 2a and contact point 3a. In particular, the plate spring 3' and contact point 3'a constitute a protruding configuration for effective contact-point functioning.

The plate spring 2' contacts the plate 6' and the plate spring 3' contacts the plate 7', and are fixed to the housing 8. Contact of the contact point 2'a of the plate. spring 2' and of the contact point 3'a of the plate spring 3' is detected by an electrical signal due to change in resistance between the plates 6' and 7'. This electrical signal may be output directly from the plate springs 2' and 3'.

Tip portions of the plate springs 2 and 2' contact a first cam 1a of noncircular configuration formed on a rotor 1 of nonmetal fabrication and tip portions of the plate springs 3 and 3' contact a second cam 1b of semicircular configuration, constantly urging the rotor 1 in a direction opposite to a rotational direction thereof during acceleration detection. For this reason, the rotor 1 does not move even if subjected to slight acceleration during travel.

By action of acceleration of a predetermined value or more, a moment occurs in the center of gravity due to the law of inertia, and the weight 4 rotates with the shaft 5 as the center in resistance to urging force of the plate springs 2 and 2a' acting via the rotor 1, the rotor 1 fixed on the weight 4 rotates together with the weight 4.

The rotor 1 presses the plate springs 2 and 2' along with rotation and causes contact points 2a and 2'a of the plate springs 2 and 2' to be displaced, and thereby the gaps between the contact point 2a and contact point 3a and the contact point 2'a and contact point 3'a narrow, and ultimately make contact.

According to the present embodiment, two independent electrical signals are obtained by outputting these contacting state as electrical signals. In particular, the plate springs 2' and 3' are of identical size to the plate springs 2 and 3 and are disposed in an identical state, and so the two pairs of contact points (contact point 2a and contact point 3a, and contact point 2'a and contact point 3'a) operating in the same phase, and all the acquired signals have little variation in response time and the like, and accordingly it is possible to obtain two independent electrical signals of identical characteristics.

Additionally, the increase in the number of parts is small in comparison with a case where two devices with a single pair of contact points are employed, and so it is possible to achieve two contact points at low cost.

A fifth embodiment will be described next with reference to FIG. 9.

Figure 9:
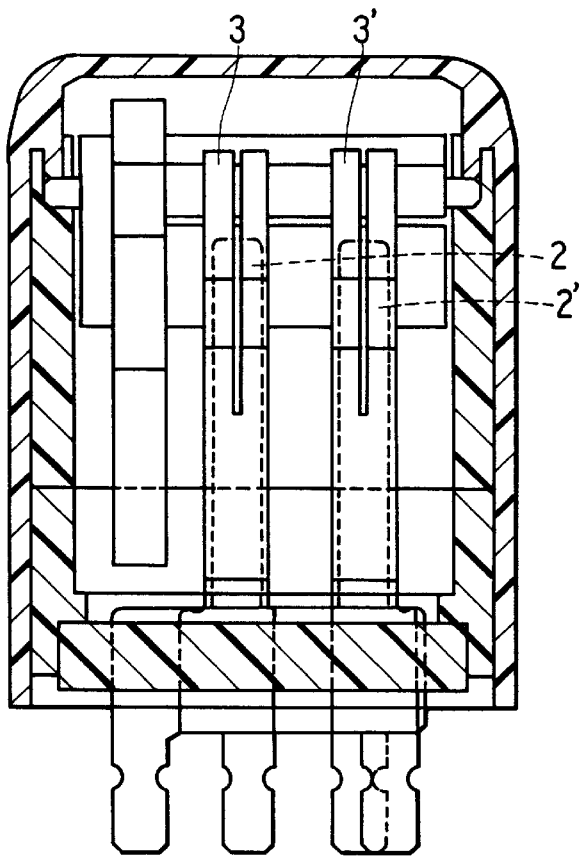
FIG. 9 is a front view indicating a structure of an acceleration detecting device according to a fifth embodiment of the present invention, which has two pairs of plate springs forming slits.

FIG. 9 is a front view indicating a structure of a fifth embodiment according to the present invention.

A difference between the fifth embodiment and the fourth embodiment is the point that whereas the fourth embodiment did not provide slits with respect to the plate springs 2 and 2' and the plate springs 3 and 3', the fifth embodiment provides slits with respect to plate springs 2 and 2' and plate springs 3 and 3'.

In a case where slits are provided, even if foreign matter adheres between respective contact points during contact of contact points 2a and 2a' and contact points 3a and 3a', it is possible for one side divided by the slit to make contact, and so reliability of contact-point functioning is improved.

A sixth embodiment will be described hereinafter with reference to FIG. 10.

Figure 10:
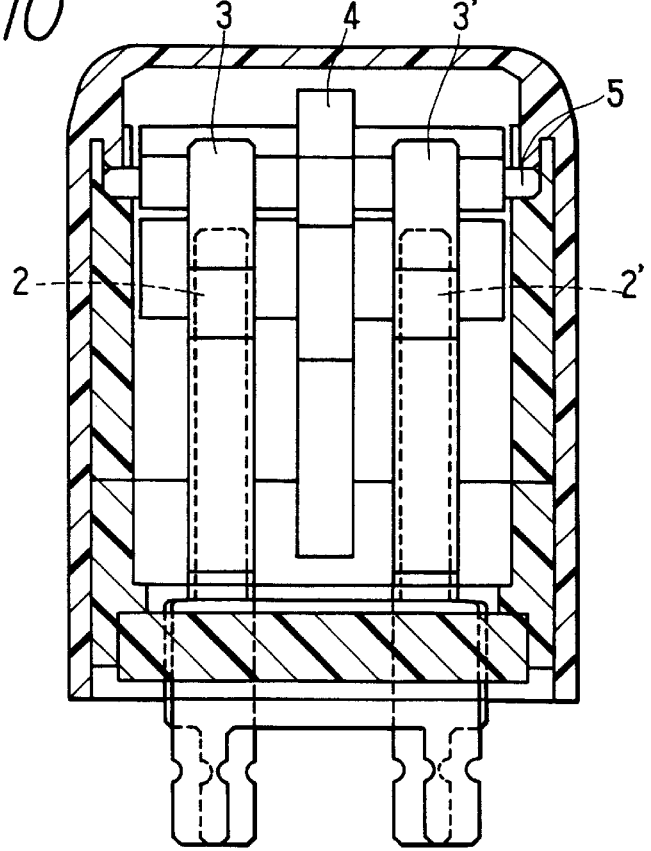
FIG. 10 is a front view indicating a structure of an acceleration detecting device according to a sixth embodiment of the present invention, which has two pairs of plate springs disposed on two sides of a weight.

FIG. 10 is a front view indicating a structure of a sixth embodiment according to the present invention.

A difference between the sixth embodiment and the fourth embodiment is the point that whereas the weight 4 was disposed at an end of the shaft 5 in the fourth embodiment, in the sixth embodiment a weight 4 is disposed in a center portion of a shaft 5, and plate springs 2 and 3 and plate springs 2' and 3' are disposed on both ends of the weight 4; operation is similar to the fourth embodiment.

The structure according to the present embodiment causes gaps between two pairs of contact points to be the same to acquire two independent electrical signals having identical characteristics, but a structure which provides differing contact gaps and can obtain signals of differing characteristics is also acceptable.

According to the above-described structure, the rotor 1 and weight 4 are structured as separate bodies, but integral formation of the rotor 1 and weight 4 is also acceptable.

Additionally, the shaft 5 was fixed to a housing 8, but it is also acceptable to fix the shaft 5 to a cover 9.

The structure utilized press-fitting as a method to fix the cover 9 to the housing 8, but performance by a method other than press-fitting is also acceptable.

The structure caused the rotor 1 to rotate around the shaft 5 with the rotor 1 and shaft 5 as separate bodies, but it is also acceptable to form the rotor 1 and shaft 5 integrally so that the shaft 5 rotates.

A seventh embodiment will be described hereinafter with reference to FIGS. 11 and 12.

Figure 11:
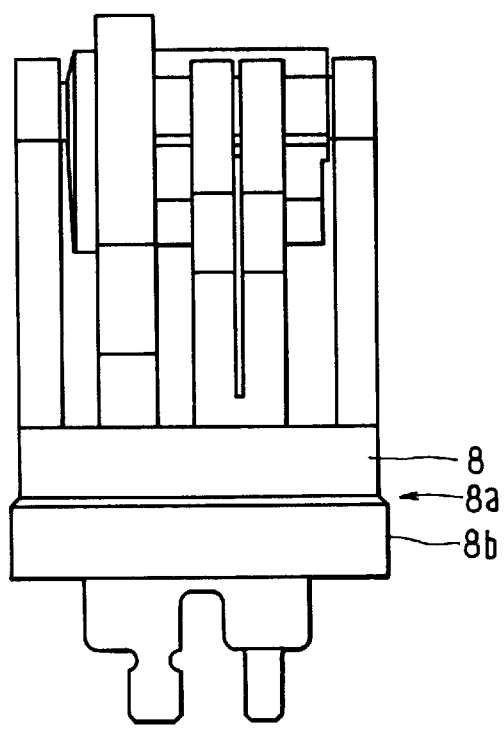
FIG. 11 is a structural diagram of an acceleration detecting device according to a seventh embodiment of the present invention, indicating a structure where an escape portion is formed on a housing.
Figure 12:
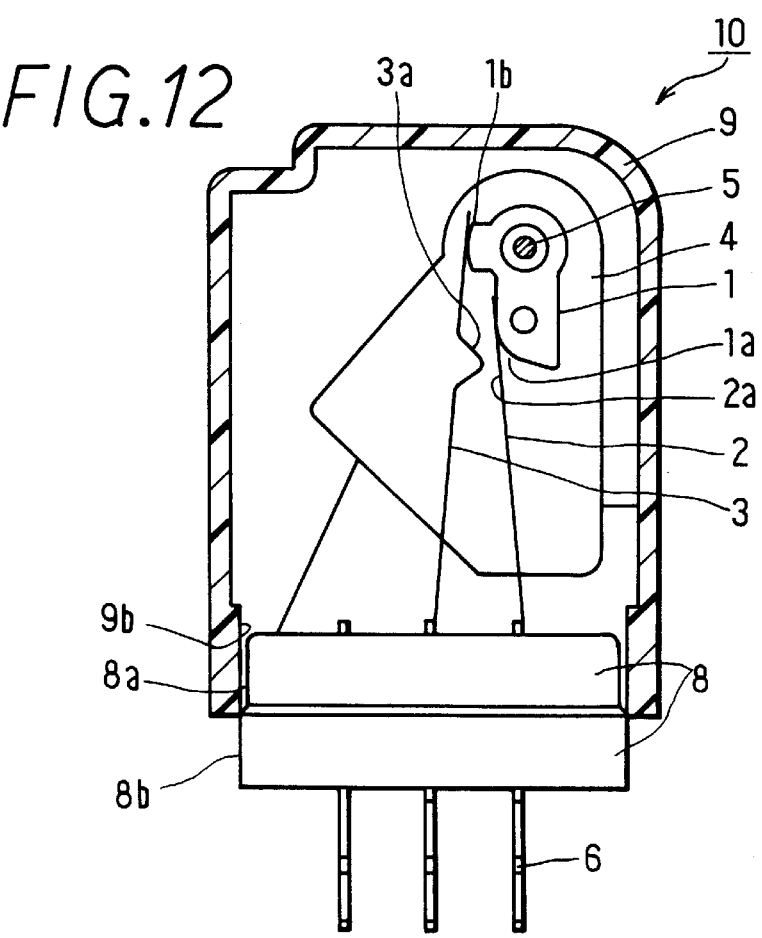
FIG. 12 is a right-hand view of an acceleration detecting device according to the seventh embodiment of the present invention, indicating a structure where an escape portion is formed on a housing press-fitted into a cover.

FIG. 11 is a front view indicating a structure of a seventh embodiment according to the present invention without a cover 9 as in FIG. 12, and FIG. 12 is a right-hand view of the structure of the seventh embodiment according to the present invention.

A characteristic of the present embodiment is that in a case of forming a casing of an acceleration detecting device 10 by press-fitting a housing 8 to a cover 9, an escape portion 8a (corresponding to a first mating portion) of a uniform outer peripheral configuration dimension which is smaller than an outer peripheral configuration dimension of a press-fit portion 8b (corresponding to a second mating portion) of the housing 8 is provided on an upper portion of the press-fit portion 8b. Because of this, press-fitting of the housing 8 and cover 9 can be performed favorably.

When the housing 8 is caused to have a structure with no escape portion 8a, the configurational dimensions of the press-fit portions of the housing 8 and cover 9 are tight, and so provisional assembly of press-fitting of the housing 8 and cover 9 becomes unstable, and press-fitting cannot be performed favorably.

Figure 16:
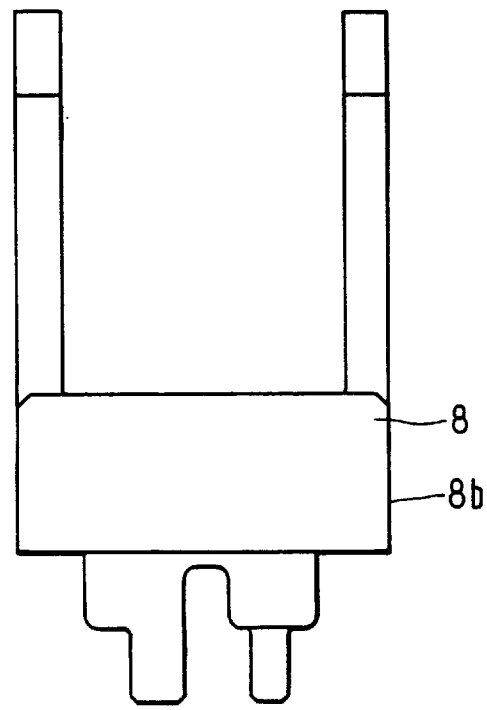
FIG. 16 is a front view indicating a structure of a housing according to the prior art.

For example, FIG. 16 indicates a front view of a prior art where the press-fit portion 8b of the housing 8 is formed with a uniform outer peripheral configurational dimension without providing an escape portion on the housing 8. Because the outer peripheral configurational dimension of the press-fit portion 8b of the housing 8 is substantially equal to an inner peripheral configurational dimension of the cover 9, provisional assembly of the housing 8 and cover 9 becomes unstable.

Figure 17:
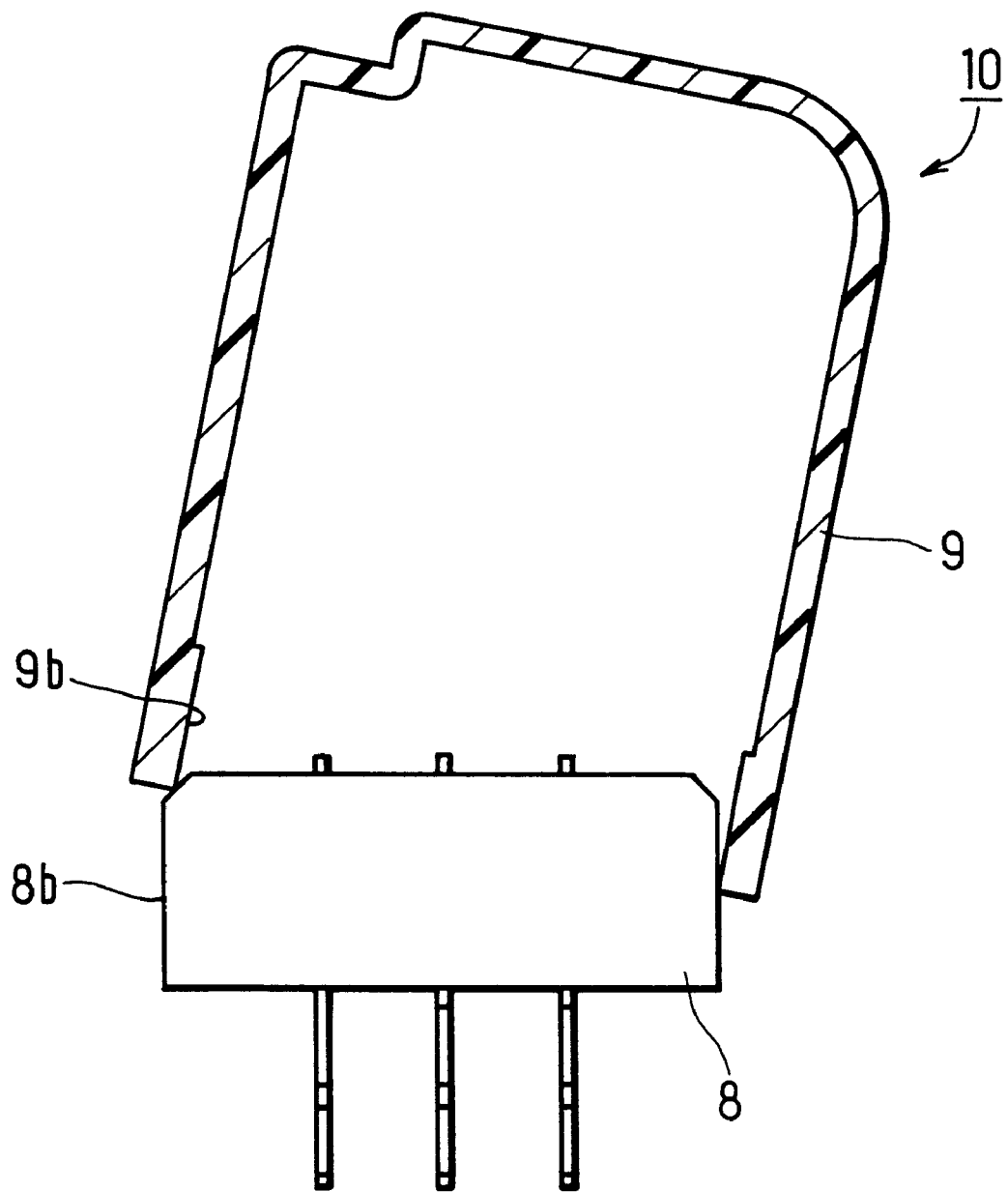
FIG. 17 is a right-hand view indicating a state wherein a cover is tilted when the cover is joined employing a housing according to the prior art.

FIG. 17 is a right-hand view indicating a state of unstable provisional assembly of a cover 9 and a housing 8 lacking an escape portion.

When no escape portion is provided on the housing 8, the outer peripheral configurational dimension of the press-fit portion 8b of the housing 8 and an inner peripheral configurational dimension of a press-fit portion 9b of the cover 9 are tight, and so the cover 9 tilts with respect to the housing 8, as shown in FIG. 17.

Because provisional assembly of the cover 9 and housing 8 must be carried out prior to press-fitting the cover 9 and housing 8 without causing the cover 9 to be tilted, work performance of assembly of the acceleration detecting device 10 declines.

Additionally, because provisional assembly of the housing 8 and cover 9 is unstable, there exists the possibility of the cover 9 tilting with respect to the housing 8 during press-fitting even if it was possible to perform provisional assembly favorably, and in this case the occurrence of damage to the cover 9 such as splitting or the like may be unavoidable.

According to the present embodiment, as shown in FIG. 12, by providing an escape portion 8a of a uniform outer peripheral configuration dimension which is smaller than an outer peripheral configuration dimension of a press-fit portion 8b of the housing 8, the escape portion 8a and the press-fit portion 9b of the cover 9 mate loosely, and so the housing 8 and cover 9 can easily be provisionally assembled.

Moreover, the escape portion 8a of the housing 8 can be caused to act as a guide during provisional assembly of the housing 8 and cover 9, and provisional assembly of the housing 8 and cover 9 can be performed with arrangement of the posture.

When the housing 8 is press-fitted to the cover 9 after provisional assembly of the housing 8 and cover 9, the housing 8 and cover 9 are provisionally assembled with the posture arranged, and so the housing 8 can be caused to be press-fitted to the cover 9 in a stabilized manner, the press-fit portion 8b and press-fit portion 9b mate favorably, and there is no occurrence of damage such as splitting to the cover 9.

In this way, according to the present embodiment assembly performance of the acceleration detecting device 10 is improved by providing an escape portion 8a on the housing 8, and along with this, there is no occurrence of damage such as splitting, and so quality of the acceleration detecting device 10 can be caused to improve.

In the foregoing structure indicated in FIG. 11 the escape portion 8a was disposed on the housing 8, but it is also acceptable to dispose an escape portion on a cover 9.

Figure 13:
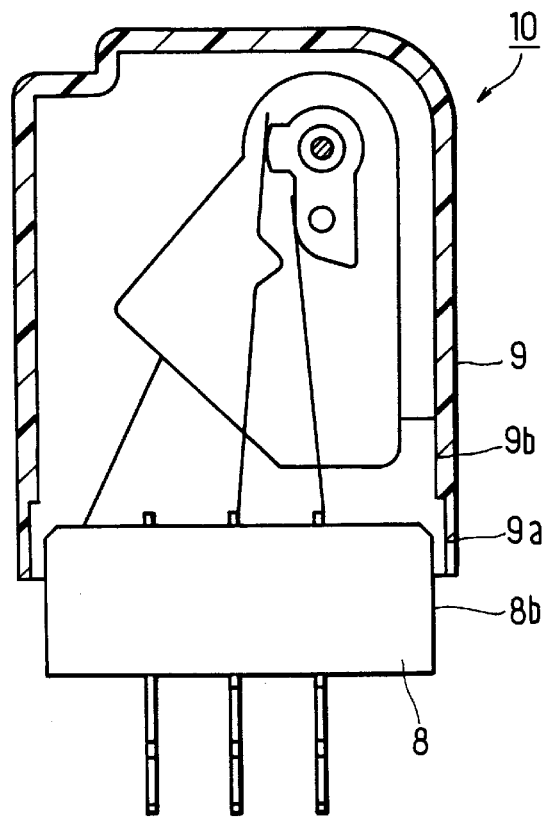
FIG. 13 is a right-hand view of an acceleration detecting device according to an eighth embodiment of the present invention, indicating a structure where an escape portion is formed on a cover.

FIG. 13 indicates, as an eighth embodiment, a right-hand view of an acceleration detecting device 10 in a case where an escape portion 9a of a uniform inner peripheral configurational dimension which is larger than an inner peripheral configurational dimension of a press-fit portion 9b of a cover 9 is disposed. A structure which does not dispose an escape portion on a housing 8 is utilized at this time.

As shown in FIG. 13, the inner peripheral configurational dimension of the escape portion 9a is larger than an outer peripheral configurational dimension of a press-fit portion 8b on a housing 8 due to the provision of the escape portion 9a on the cover 9, and so the escape portion 9a and press-fit portion 8b mate loosely, and provisional assembly of the housing 8 and cover 9 can easily be performed.

Additionally, because the escape portion 9a of the cover 9 acts as a guide during provisional assembly of the housing 8 and cover 9 and provisional assembly of the housing 8, and cover 9 can be performed with the posture arranged, the housing 8 and cover 9 can be press-fitted in a stabilized manner, and press-fitting of the press-fit portion 8b of the housing 8 and press-fit portion 9b of the cover 9 can be accomplished favorably.

Moreover, the escape portion 8a of the housing 8 shown in FIG. 11 and the escape portion 9a of the cover 9 shown in FIG. 13 were respectively of a uniform outer peripheral configurational dimension and inner peripheral configurational dimension, but it is also acceptable if the outer peripheral configurational dimension and inner peripheral configurational dimension of the escape portions are not uniform.

Figure 14:
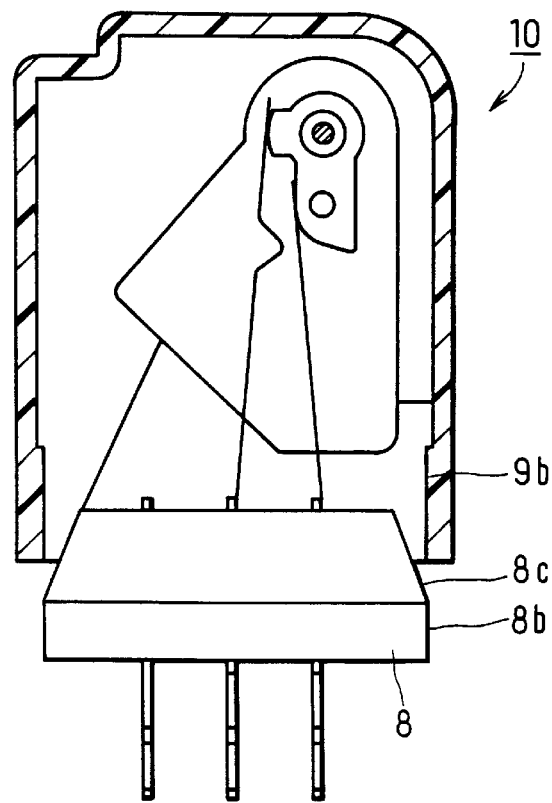
FIG. 14 is a right-hand view of an acceleration detecting device according to a ninth embodiment of the present invention, indicating a structure where a tapered portion is formed on a housing.
Figure 15:
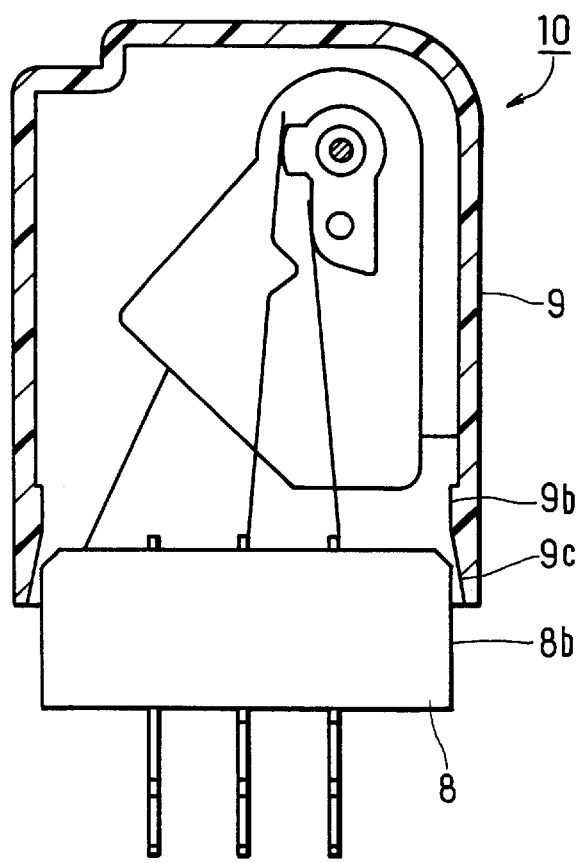
FIG. 15 is a right-hand view of an acceleration detecting device according to a tenth embodiment of the present invention, indicating a structure where a tapered portion is formed on a cover.

For example, FIG. 14 indicates, as a ninth embodiment, a right-hand view of an acceleration detecting device 10 in a case where a tapered portion 8c of an outer peripheral configurational dimension smaller than an outer peripheral configurational dimension of a press-fit portion 8b is provided on a housing 8, and FIG. 15 indicates, as a tenth embodiment, a right-hand view of an acceleration detecting device 10 in a case where a tapered portion 9c of an inner peripheral configurational dimension larger than an inner peripheral configurational dimension of a press-fit portion 9b is provided on a cover 9.

At this time, no escape portion is disposed on the cover 9 in FIG. 14, and no escape portion is disposed on the housing 8 in FIG. 15.

As shown in FIG. 14, the outer peripheral configurational dimension of the tapered portion 8c is smaller than an inner peripheral configurational dimension of the press-fit portion 9b of the cover 9 due to the tapered portion 8c being provided on the housing 8, and so the tapered portion 8c and the press-fit portion 9b of the cover 9 mate loosely, and provisional assembly of the housing 8 and cover 9 can easily be performed.

Additionally, because the tapered portion 8c acts as a guide during provisional assembly of the housing 8 and cover 9, and provisional assembly of the housing 8 and cover 9 can be performed with the posture arranged, the housing 8 and cover 9 can be caused to be press-fitted in a stabilized manner, and press-fitting of the press-fit portion 8b of the housing 8 and press-fit portion 9b of the cover 9 can be accomplished favorably.

As shown in FIG. 15, a similar effect can also be obtained by disposing the tapered portion 9c on the cover 9.

That is to say, because the inner peripheral configurational dimension of the tapered portion 9c is larger than the outer peripheral configurational dimension of the press-fit portion 8b of the housing 8, the tapered portion 9c and press-fit portion 8b mate loosely, and provisional assembly of the housing 8 and cover 9 can easily be accomplished.

Additionally, because the tapered portion 8c acts as a guide during provisional assembly of the housing 8 and cover 9, and provisional assembly of the housing 8 and cover 9 can be performed with the posture arranged, the housing 8 and cover 9 can be caused to be press-fitted in a stabilized manner, and press-fitting of the press-fit portion 8b and press-fit portion 9b of the cover 9 can be performed favorably.

Furthermore, according to the above embodiments an escape portion was disposed on either the housing 8 or the cover 9, but a structure which forms an escape portion on both the housing 8 and cover 9 is also acceptable.

An eleventh embodiment according to the present invention will be described next.

Figure 18A:
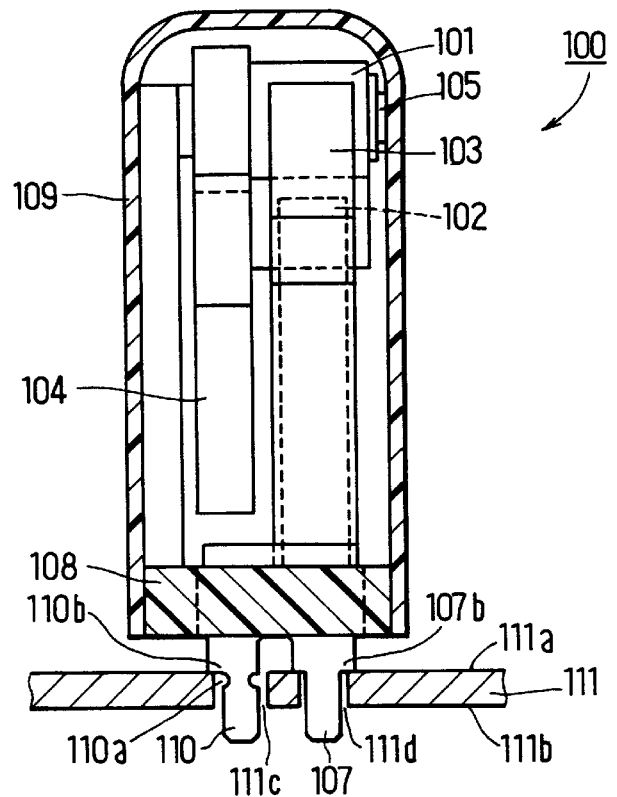
FIG. 18A is a front view of an eleventh embodiment according to the present invention showing a state when terminals for installation use and signal-output terminals have been inserted into through-holes of a substrate.
Figure 18B:
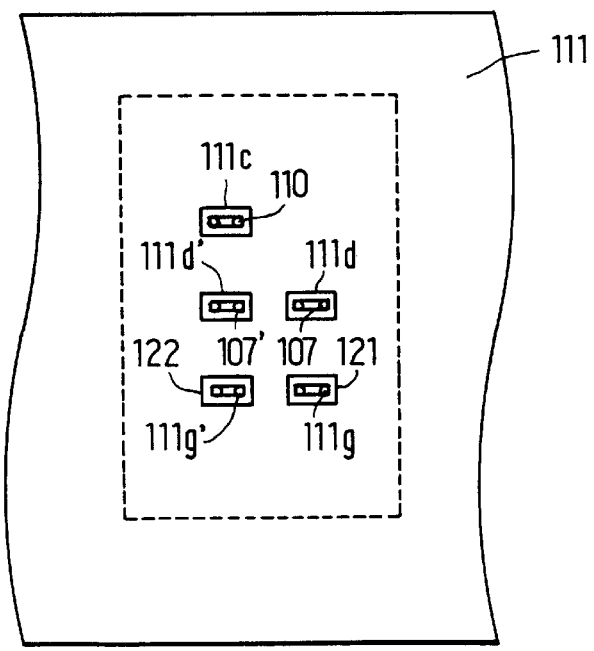
FIG. 18B is a bottom view of an eleventh embodiment according to the present invention showing a state when terminals for installation use and signal-output terminals have been inserted into through-holes of a substrate.

FIG. 18A and FIG. 18B are a front view and a bottom view indicating a state when terminals 110 and 122 for installation use and signal-output terminals 107, 107', and 121 disposed on a housing 108 of an acceleration detecting device 100 employed on a vehicle have respectively been inserted into insertion (through) holes 111c, 111d, 111d', 111g, 111g' of a substrate 111.

Figure 19:
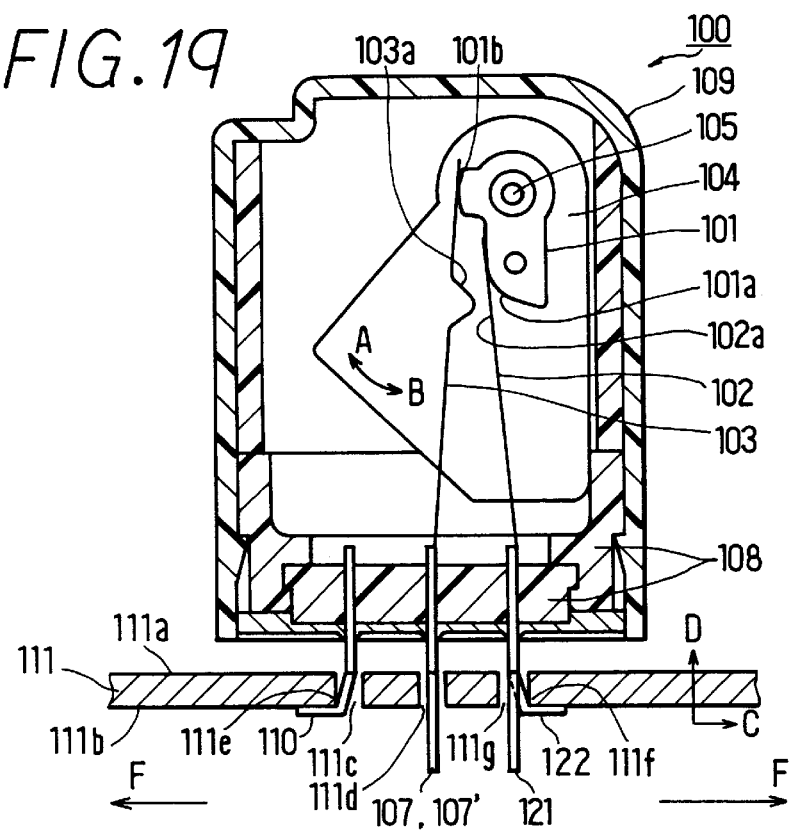
FIG. 19 is a side view of the eleventh embodiment according to the present invention showing a state when terminals for installation use and signal-output terminals have been inserted into through-holes of the substrate and the terminals for installation use have been bent.

Additionally FIG. 19 indicates a side view of when the terminals 110 and 122 for installation use have been bent and crimped after insertion of the terminals 110 and 122 for installation use and the signal-output terminals 107, 107' and 121 into the insertion holes 111c, 111d, 111d', 111g, 111g '.

The acceleration detecting device 100 is structured primarily from a weight 104 having an eccentric center of gravity and rotational center, a rotor 101 which rotates together with the weight 104, a pair of plate springs 102 and 103, and shaft 105 becoming a center for rotation of the weight 104 and rotor 101.

In addition to this, the acceleration detecting device 100 is structured from a signal-output terminals 107, 107' and 121 to output a contacting state of the plate springs 102 and 103 to an external portion as electrical signals, terminals 110 and 122 for installation use of gold fabrication to fix the acceleration detecting device 100 to a substrate 111, a cover 109, and a housing 108.

Moreover, of the above-described structure, the signal-output terminals 107 and 107' as well as signal-output terminal 121 and the terminal 122 for installation use are formed of respectively separate bodies which are integrally crimped, and the terminal 110 for installation use is formed of a discrete body.

Figure 20A:
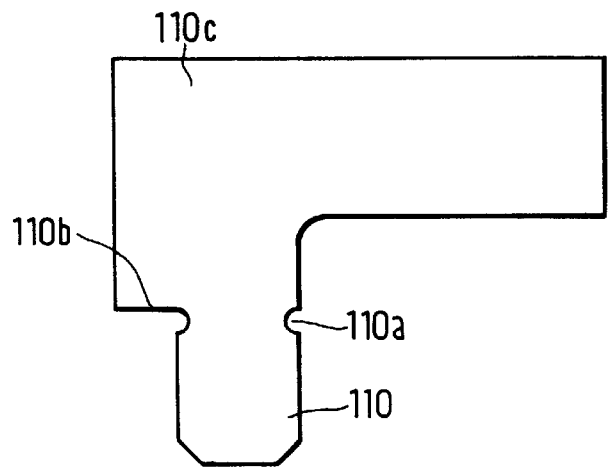
FIG. 20A is a structural diagram indicating a structure of the terminal for installation use of the eleventh embodiment according to the present invention.
Figure 20B:
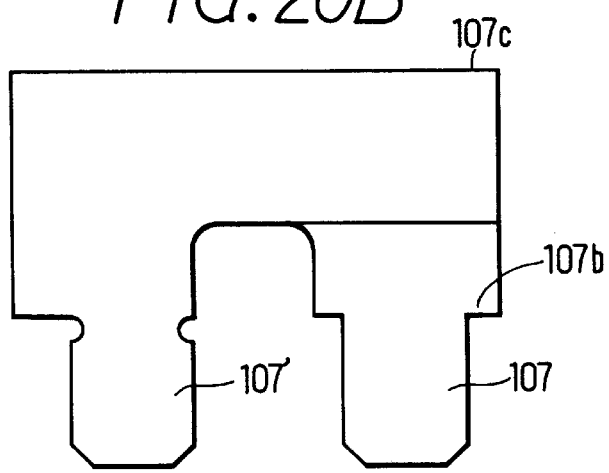
FIG. 20B is a structural diagram indicating a structure of the signal-output terminal.
Figure 20C:
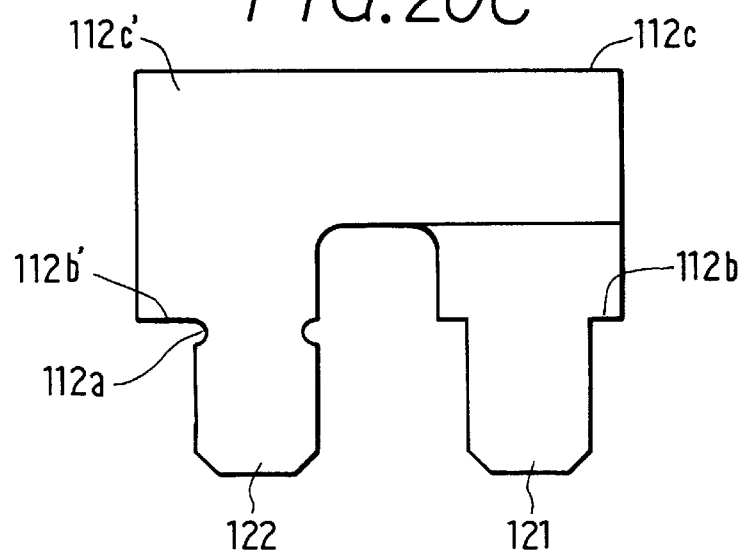
FIG. 20C is a structural diagram indicating a structure of a terminal doubling in use as a terminal for installation use and a signal-output terminal.

The structures of the signal-output terminals 107 and 107', the terminal 110 for installation use, and the signal-output terminal 121 and terminal 122 for installation use are shown respectively in FIGS. 20A, 20B, and 20C.

According to the present embodiment, the configuration of the terminals 110 and 122 for installation use are formed by stamping.

Relationships between the several structures and a mode of operation of the acceleration detecting device 100 will be described next with reference to FIG. 19.

The weight 104 is installed freely rotatably with respect to the shaft 105, and an axial center of rotation due to the shaft 105 is positioned above a center of gravity of the weight 104.

When for example a vehicle collides, deceleration (negative acceleration) occurs and inertial force is applied in direction A in the drawing with respect to the weight center of the weight 104.

Due to this inertial force acting on the center of gravity, the weight 104 rotates in direction A with the shaft 105 as the center. A structure is utilized whereby the cover 109 is employed as a stopper of the weight 104, the cover 109 and weight 104 contact, and the weight 104 is not allowed to rotate in direction A for a predetermined angle of rotation or more at this time.

Additionally, during acceleration of the vehicle, acceleration of a direction opposite to a direction of deceleration is applied to the center of gravity of the weight 104, and the weight 104 rotates in direction B in the drawing. At this time as well, a structure is utilized whereby the cover 109 is employed as a stopper of the weight 104, the cover 109 and weight 104 contact, and the weight 104 is not allowed to rotate in direction B for a predetermined angle of rotation or more.

The rotor 101 has a first cam 101a and a second cam 101b, is fixed on the weight 104, and shares the shaft 105 with the weight 104.

During collision of the vehicle, the weight 104 rotates in direction A in the drawing, and in accompaniment to this, the rotor 101 also rotates in direction A. Additionally, during acceleration of the vehicle, the weight 104 rotates in direction B in the drawing, and in accompaniment to this, the rotor 101 also rotates in direction B.

The plate springs 102 and 103 respectively have contact points 102a and 103a, and respectively contact the first cam 101a and second cam 101b of the rotor 101 and urge the rotor 101 in direction B in the drawing.

During collision of the vehicle, when the rotor 101 rotates in accompaniment with the rotation of the weight 104, the first cam 101a and second cam 101b are displaced.

The plate springs 102 and 103 respectively contacting the first cam 101a and second cam 101b of the rotor 101 are pressed in direction A in the drawing, the gap of the contact point 102a and contact point 103a narrows, and ultimately the contact point 102a and contact point 103a make contact.

This contacting state of the contact point 102a and contact point 103a is detected as electrical signals from the signal-output terminals 107, 107', and 122 respectively fixed at the plate springs 102 and 103 and the housing 108. The electrical signals are used as acceleration detecting signals.

Moreover, according to the above-described structure, the plate springs 102 and 103 constantly urge the rotor 101 in a direction opposite to a direction of deceleration during collision, and so they also function to prevent actuation of the acceleration detecting device 100 due to vibration or the like during travel of the vehicle.

The structure of the terminals 110 and 122 for installation use which are employed to fix the acceleration detecting device 100 composed of the above-described structure to the substrate 111 and the signal-output terminals 107, 107', and 121 will be described next with reference to FIG. 20.

The terminals 110 and 122 for installation use are composed of notch portions 110a and 112a notched in a semi-circular configuration, contact portions 110b and 112b' which contact an upper surface 111a of the substrate 111, and fixed portions 110c and 112c' which are fixed to the housing 108.

These fixed portions 110c and 112c' are fixed by insert formation with respect to the housing 108.

Furthermore, terminals 110 and 122 for installation use which cause the length between the notch portions 110a and 112a and the contact portions 110b and 112b' to be zero are formed according to the present embodiment.

Additionally, the signal-output terminals 107, 107' and 121 are composed of contact portions 107b and 112b which contact an upper surface 111a of the substrate 111, and contact portions 107c and 112c which are fixed to the housing 108 and contact the plate springs 102 and 103.

The method of fixing to the substrate 111 of an acceleration detecting device 100 employing the terminals 110 and 122 for installation use and signal-output terminals 107, 107', and 121 will be described next with reference to FIGS. 18 and 19.

Firstly, the terminals 110 and 122 for installation use and signal-output terminals 107, 107', and 121 are inserted from the upper surface 111a side of the substrate 111 into the insertion holes 111c, 111d, 111d', 111g and 111g' respectively provided in the substrate 111 until the respective contact portions 110b, 112b', 107b, and 112b of the terminals 110 and 122 for installation use and signal-output terminals 107, 107', and 121 contact to the upper surface 111a of the substrate 111. At this time, the terminals 110 and 122 for installation use and signal-output terminals 107, 107', and 121 pass through the substrate 111.

Herein, the notch portions 110a and 112a of the terminals 110 and 122 for installation use are positioned at upper ends of the insertion holes 111c and 111g'.

After the terminals 110 and 122 for installation use and signal-output terminals 107, 107', and 121 have passed through the substrate 111, an external force F is applied in a direction parallel to the lower surface 111b and crimping is performed with respect to a portion of the terminals 110 and 122 for installation use protruding from a lower surface 111b side.

Due to the action of this external force F, the terminals 110 and 122 for installation use bend from the notch portions 110a and 112a, and the portion protruding from the lower surface 111b is bent along the lower surface 111b with insertion hole lower ends 111e and 111f as fulcrums.

In this way, the terminals 110 and 112 for installation use can apply load in two directions: a radial direction (direction C in the drawing) of the insertion holes 111c and 111g along the lower surface of the substrate 111 and a direction of plate thickness (direction D in the drawing) of the substrate 111.

Figure 22:
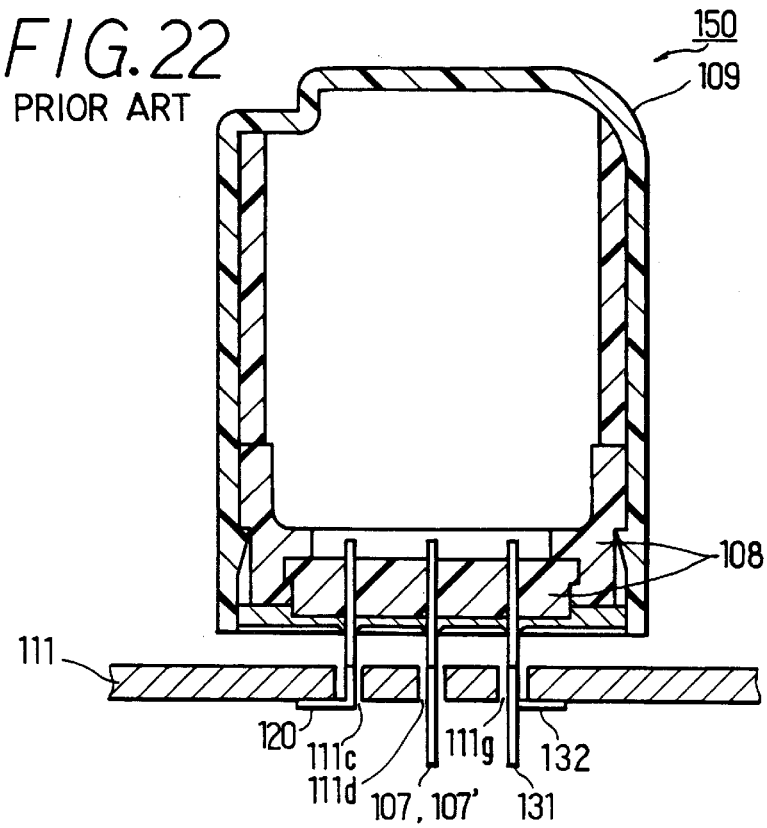
FIG. 22 is a side view of an acceleration detecting device according to the prior art showing a state when a terminal for installation use and signal-output terminal have been inserted into through-holes of a substrate and the terminal for installation use has been bent.
Figure 21A:
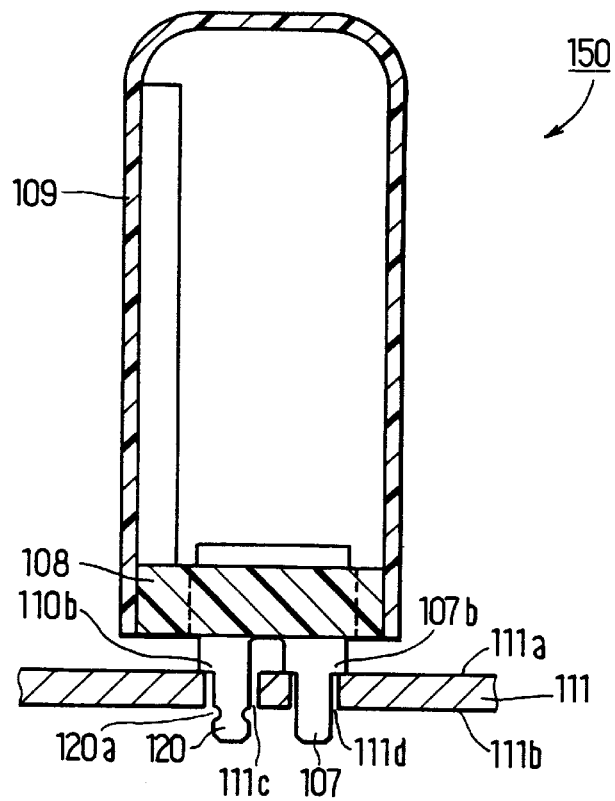
FIG. 21A is a front view of an acceleration detecting device according to the prior art showing a state when a terminal for installation use and signal-output terminal have been inserted into through-holes of a substrate.
Figure 21B:
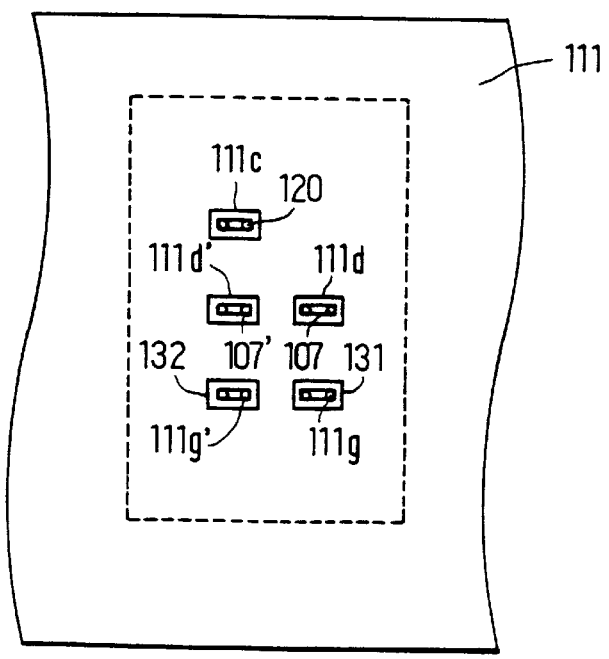
FIG. 21B is a bottom view of an acceleration detecting device according to the prior art showing a state when a terminal for installation use and signal-output terminal have been inserted into through-holes of a substrate.

Due to this load, the contact portions 110b and 112b' of the terminals 110 and 122 for installation use and respectively crimped portions can squeeze the substrate 111, and so the acceleration detecting device 100 can be fixed on the substrate 111 more firmly in comparison with a prior-art device 150 indicated in FIGS. 21A, 21B and 22. Furthermore, according to this prior-art device 150 a notch portion 120a is formed on a portion of terminals 120 and 132 for installation use protruding from the substrate 111.

After the acceleration detecting device 100 is fixed to the substrate 111 by the terminals 110 and 122 for installation use, the signal-output terminals 107, 107', and 121 and the terminals 110 and 122 for installation use are soldered to the substrate 111.

Electrical connection of the acceleration detecting device 100 and the substrate 111 is accomplished by this soldering, and installation of the acceleration detecting device 100 to the substrate 111 is completed.

Moreover, the signal-output terminals 107, 107', and 121 are fixed to the substrate 111 only by this soldering.

According to the foregoing embodiment, the terminals 110 and 122 for installation use are fixed to the housing 108 by insert formation, but fixing the terminals 110 and 122 for installation use to the housing 108 by adhesive, screws, or the like is also acceptable.

Additionally, the acceleration detecting device 100 utilized a structure of detecting a contacting state between the contact points 102a and 103a of the pair of plate springs 102 and 103, but a structure wherein an acceleration detecting device having one pair or more of plate springs can detect a plurality of contacting states between contact points is also acceptable.

Furthermore, the present embodiment utilized a structure wherein the signal-output terminals 107 and 107' as well as the signal-output terminal 121 and terminal 122 for installation use were respectively formed as separate bodies and crimped to become an integral body, and the terminal for installation use 110 was formed as a discrete structure, but structuring of terminals for installation use and signal-output terminals entirely of separate bodies is also acceptable. And utilization of a structure wherein terminals for installation use and signal-output terminals are all caused to double in use is acceptable as well.

In addition, according to the present embodiment the terminals 110 and 122 for installation use were structured of brass, but it is acceptable to structure the terminals for installation use of any material which does not cause splitting, voiding, or the like to occur when performing crimping is acceptable.

The present embodiment utilized a structure wherein the notch portions 110a and 112a were disposed on an upper end of the insertion holes 111c and 111g' by causing the length between the notch portions 110a and 112a and the contact portions 110b and 112b' of the terminals 110 and 122 for installation use to be zero, but the present invention is not exclusively restricted to this, and a structure disposing the notch portions 110a and 112a within the insertion holes 111c and 111g' is also acceptable.

That is to say, the length from the contact portions 110b and 112b' to the notch portions 110a and 112a of the terminals 110 and 122 for installation use must be less than the plate thickness of the substrate 111.

According to the present embodiment, the configuration of the notch portions 110a and 112a of the terminals 110 and 122 for installation use was a semicircular configuration, but the present invention is not exclusively restricted to this, and an elliptical configuration, a triangular configuration, a rectangular configuration, a configuration combining lines and curves, and so on—i.e., any configuration forming a constriction so that the sectional surface area of the terminals 110 and 122 for installation use becomes smaller than another portion—is acceptable. Preferably, to avoid splitting or the like of a minimum sectional surface area due to stress concentration, any portion of an minimum sectional surface area of the notched portions 110a and 112a having curvature is acceptable.

According to the present embodiment, a structure installing the acceleration detecting device 100 on the substrate 111 was described, but the present invention is not exclusively restricted to this, and is effective even when the acceleration detecting device 100 is installed on a material other than the substrate 111, a housing, or the like. Further, the present invention can be applied to an electronic-component device other than the acceleration detecting apparatus.

According to the present invention, as indicated above, notch portions of terminals 110 and 122 for installation use can be disposed within an insertion hole of a substrate 111, particularly at an upper end of the insertion hole when contact portions of the terminals 110 and 122 for installation use contact one side of the substrate 111, by causing a length from the contact portion to the notch portion to be smaller than plate thickness of the substrate, or by forming the notch portion to be continuous with the contact portion.

Due to this, when force is applied in a direction parallel to the substrate with respect to the terminals 110 and 122 for installation use protruding on a side of another surface of the substrate 111, a side-surface portion of the terminals 110 and 122 for installation use contacts a side surface of the installation hole, and the terminals 110 and 122 for installation use can apply a load in a direction of plate thickness of the substrate 111 and in a radial direction of the insertion hole. Thereby the substrate can be squeezed by a portion where the terminal 110 and 122 for installation use is bent and the contact portion thereof and the acceleration detecting device 100 can be fixed to the substrate 111.

As a result of this, assembly-dimension precision of the acceleration detecting device 100 improves and work performance of assembly can also improve with no occurrence of play between the acceleration detecting device 100 and substrate 111, even when plate thickness of the terminal 110 and 122 for installation use is thin.

A twelfth embodiment of an acceleration detecting device according to the present invention will be described next with reference to the drawings. FIG. 23 is a front structural view of an acceleration detecting device 200.

A housing 201 is structured of a base 201a and a side plate 201b formed on a side edge of the base 201a perpendicularly to an upper surface of the base 201a. The base 201a and side plate 201b are formed of PBT (polybutylene terephthalate). According to the present embodiment, the base 201a has a width of 14 mm, a depth of 10 mm, and a thickness of 2.5 mm, and the side plate 201b has a width of 14 mm, a height of 22 mm, and a thickness of 2.5 mm. The entirety of the housing 201 is covered by a cover 202 of PBT fabrication.

The side plate 201b is formed with a groove-shaped bearing 203, and a shaft 204 is inserted into the bearing 203 by press-fitting and supported therein. A rotor 207 is structured of a weight 206 and a cam 205 which has been insert-formed on a weight 206. (In this embodiment, a combination of the weight 206 and the cam 205 is defined as the rotor 207.) The rotor 207 is inserted through the shaft 204. According to the present embodiment, the shaft 204 has a diameter of 1 mm and is formed of SUS304 stainless steel.

The rotor 207 is structured so as to rotate in a clockwise direction of FIG. 23 with the shaft 204 as a rotational center when subjected to acceleration from the direction of arrow A in FIG. 23. According to the present embodiment, the rotor 207 is formed of copper and the cam 205 is formed by molding PBT on the surface of the copper.

A plate spring 208 as a first connection terminal and a plate spring 209 as a second connection terminal are respectively mounted on the base 201a of the housing 201 in a form where lower ends thereof are insert-formed within the base 201a. A uniform gap is placed between the two plate springs 208 and 209, one plate spring 208 contacts a first cam portion 205a of the cam 205, and the other plate spring 209 contacts a second cam portion 205b. A contact point 209a of convex configuration is flexibly formed on the plate spring 209.

The two plate springs 208 and 209 respectively contact the cams 205a and 205b so as to urge the rotor 207 in a direction opposite (a counterclockwise direction in FIG. 23) to a direction of rotation during a vehicle collision, and are such that the rotor 207 does not rotate even if the vehicle decelerates during travel and slight acceleration is received.

Terminals 210 and 211 of copper fabrication and respectively conducted with the plate springs 208 and 209 are also inserted into the portion of the base 201a where the plate springs 208 and 209 are inserted. These terminals 210 and 211 are conducted to outside the base 201a, and are connected to a drive circuit 212 to drive a passenger protection apparatus. Furthermore, a fixture 213 to install the present device to a substrate or the like is insert-formed on the base 201a.

Structure of a shock-reducing member 214 which is a characterizing portion of the present embodiment will be described next.

A shock-reducing member 214 of plate configuration is provided perpendicularly to an upper surface of the base 201a on an end portion (the left-hand edge in FIG. 23) of the base 201a of the rotational direction (the clockwise direction in FIG. 23) side of the weight 206. The shock-reducing member 214 is formed integrally with the base 201a in a form causing a plate surface thereof to face a tip portion 206a of the weight 206, and flexes due to plasticity thereof when subjected to external force in the surface direction.

Moreover, according to the present embodiment, the shock-reducing member 214 has a height of 7 mm and a thickness of 0.5 mm, and a gap between the tip portion 206a of the weight 206 and the shock-reducing member 214 is 1 mm in a state where the weight 206 is not rotating.

Operation of an acceleration detecting device according to the above-described structure until a rotation moment of the weight 206 is reduced, i.e., until shock force is alleviated, will be described next.

Figure 24:
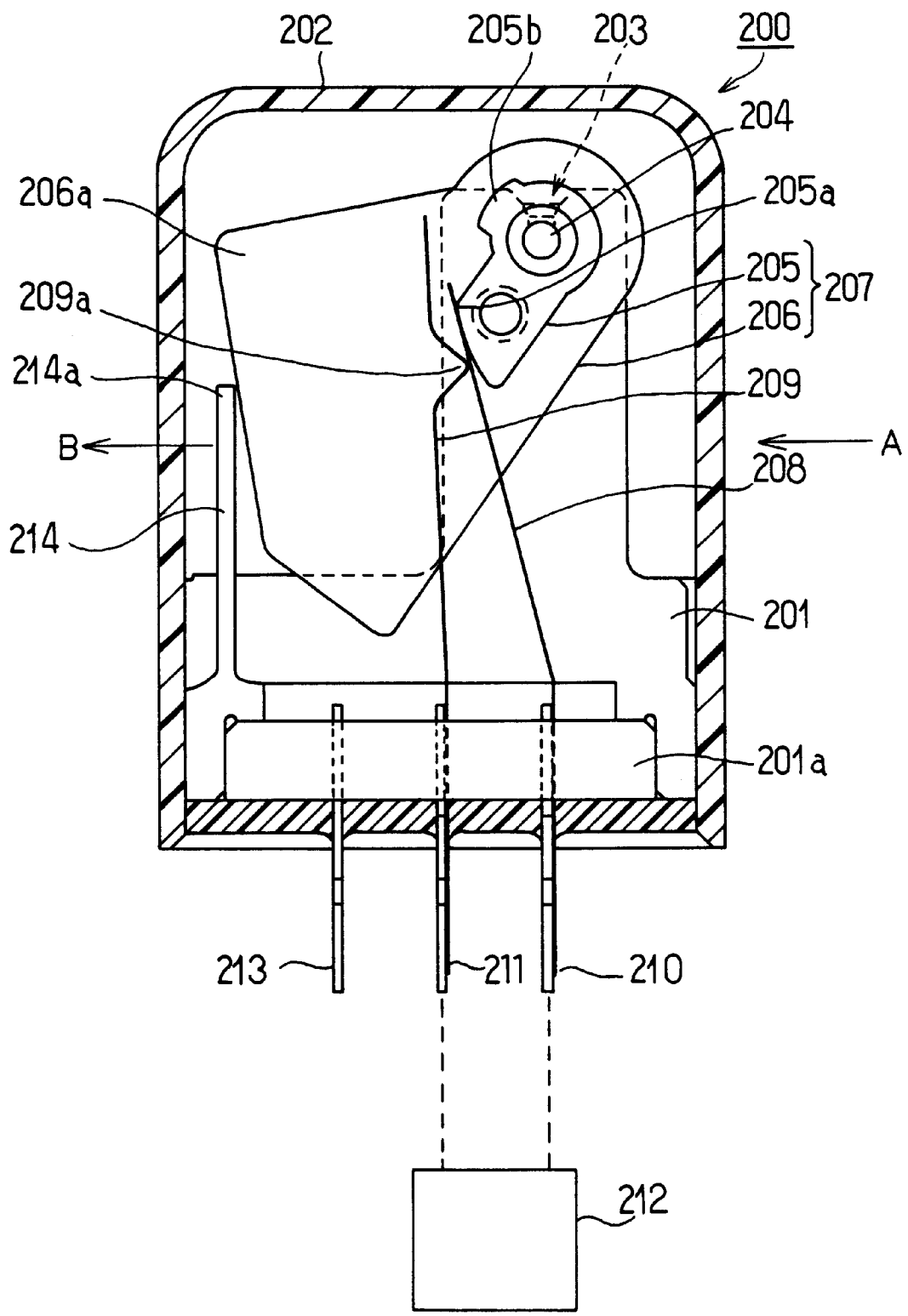
FIG. 24 is a front view indicating a state where a rotated rotor has contacted a shock-reducing member.

When the acceleration detecting device 200 is subjected to acceleration (shock) from the direction indicated by arrow A in FIG. 23, then as shown in FIG. 24, the rotor 207 rotates in the clockwise direction in the drawing due to the law of inertia. The first cam portion 205*a* of the cam 205 lowers the plate spring 208 in the direction of the plate spring 209 due to this rotation, and the tip of the plate spring 208 contacts the contact point 209*a* of the plate spring 209. Electrical conductance between the plate springs 208 and 209 is ensured by this contact, and detection of acceleration by the drive circuit 212 via the terminals 210 and 211 becomes possible. Additionally, the angle of rotation (first predetermined angle) of the rotor 207 when the tip of the plate spring 208 has contacted the contact point 209*a* of the plate spring 209 is 6° according to the present embodiment.

At this time, the tip portion 206*a* of the weight 206 which rotates together with the cam 205 contacts a tip portion 214*a* of the shock-reducing member 214, and as rotation of the weight 206 progresses, the weight 206 causes the shock-reducing member 214 to flex in the direction indicated by arrow B. Kinetic energy of the weight 206 is converted to elastic energy of the shock-reducing member 214 and is gradually reduced due to this flexion.

Furthermore, at a portion where the tip portion 206*a* of the weight 206 and the tip portion 214*a* of the shock-reducing member 214 make contact, friction force of the tip portion 206*a* and tip portion 214*a* is exerted in a tangential direction of a locus of a circle inscribed by the tip portion 206*a*, and reduction of the foregoing kinetic energy of the weight 206 is promoted.

The angle of rotation (second predetermined angle) of the rotor 207 when the tip portion 206*a* of the weight 206 has contacted the tip portion 214a of the shock-reducing member 214 is 40° and a maximum angle of rotation of the rotor 207 is 45°. Additionally, the amount of flexion of the shock-reducing member 214 is 0.3 to 0.5 mm.

The moment of inertia of the weight 206 is gradually reduced in this way, and so occurrence of shock having a short collision time as when the weight 206 collides with the cover 202 according to the prior art can be prevented.

Consequently, separation of the contact-point portions of the plate springs and detection of acceleration becoming unstable due to shock of collision of the weight 206 can be prevented. Moreover, occurrence of shock noise when the tip portion 206*a* of the weight 206 collides with the cover 202 can also be eliminated.

It is also acceptable for the shock-reducing member 214 to be formed as a separate body and mechanically installed on the base 201*a*, and it is acceptable for the plate thickness of the tip portion 214*a* to be a thin wedge configuration. Additionally, it is acceptable for the shock-reducing member 214 to be positioned higher than the tip portion 206*a* of the weight 206 of the side surface of the cover 202 and formed so that the side surface opposed the upper surface of the base 201*a*.

A thirteenth embodiment according to the present invention will be described next with reference to FIGS. 25 and 26.

An acceleration detecting device 200A according to the present embodiment is characterized by disposing a shock-reducing member on an upper area of a housing 201.

Figure 25:
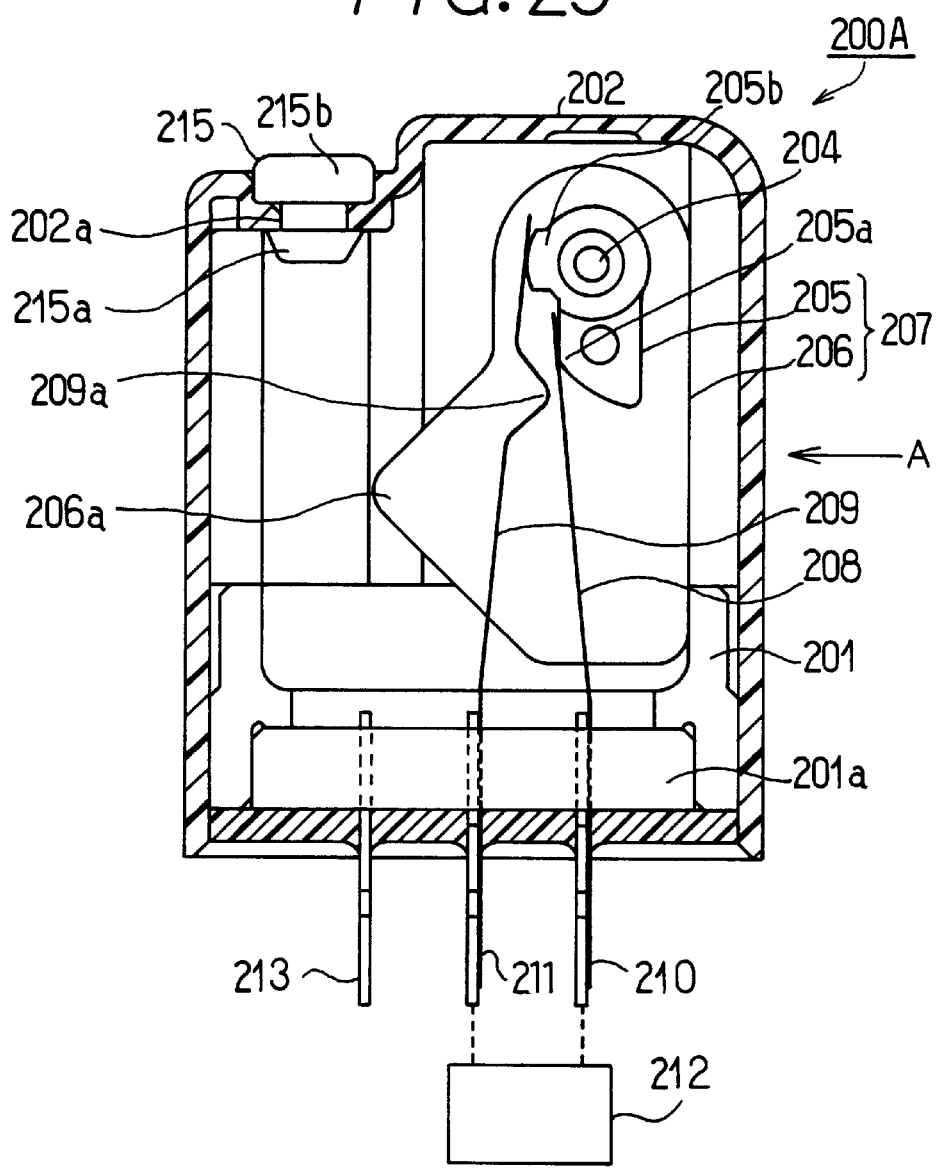
FIG. 25 is a front structural diagram wherein a shock-reducing member is installed on an upper area of a housing.
Figure 26:
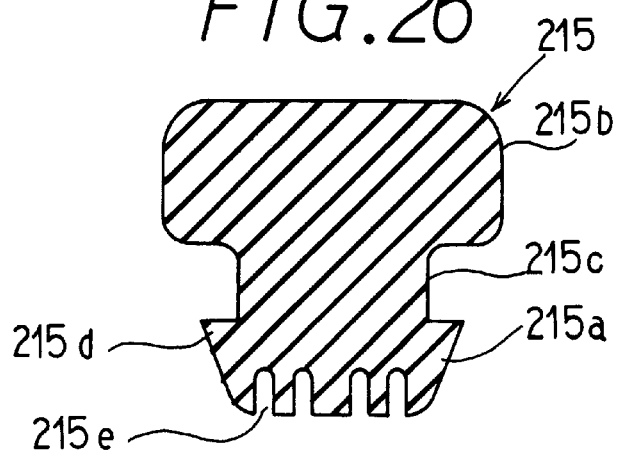
FIG. 26 is a sectional enlarged view of a shock-reducing member of a thirteenth embodiment.

As shown in FIG. 25, a hole 202*a* is formed on an upper surface of a cover 202 at that position where a locus inscribed by a tip portion of a weight 206 intersects with the upper surface of the cover 202, and a shock-reducing member 215 is fitted into this hole 202*a*. The shock-reducing member 215 is formed of elastic rubber, and is formed in a bottle-plug configuration as shown in FIG. 26. A constricted portion 215*c* of a configuration corresponding to the configuration of the hole 202*a* is formed between a collision member 215*a* and a base member 215*b*, and prevention of dislodgement is promoted by a collar portion 215*d*. A bottom surface of the shock-reducing member 215 may be formed in a plane as shown in FIG. 25, and a plurality of grooves 215*e* may be formed as shown in FIG. 26 to heighten the degree of alleviation of shock of the weight 206.

According to the present embodiment, the diameter of the base portion 215*b* of the shock-reducing member 215 is 3 mm, the diameter of the constricted portion 215*c* is 2 mm, and groove 215*e* width is 0.1 mm and depth is 0.2 mm.

Additionally, the shock-reducing member 215 may be formed of an elastic material other than elastic rubber.

Because an acceleration detecting device according to the present embodiment has the above-described structure, shock force (rotation moment) due to collision of the weight 206 can be reduced by causing the tip portion 206*a* of the weight 206 to collide with the bottom surface of the collision member 215*a* of the shock-reducing member 215.

Consequently, transmitting the shock due to collision of the weight 206 to the plate springs and separation of the contact-point portions can be prevented.

According to the present embodiment, shock-reducing member 215 was fitted in and fixed to the hole 202*a* formed on the upper surface of the cover 202, but fixing to an upper wall of the cover 202 by adhesive or the like is also acceptable.

Figure 27:
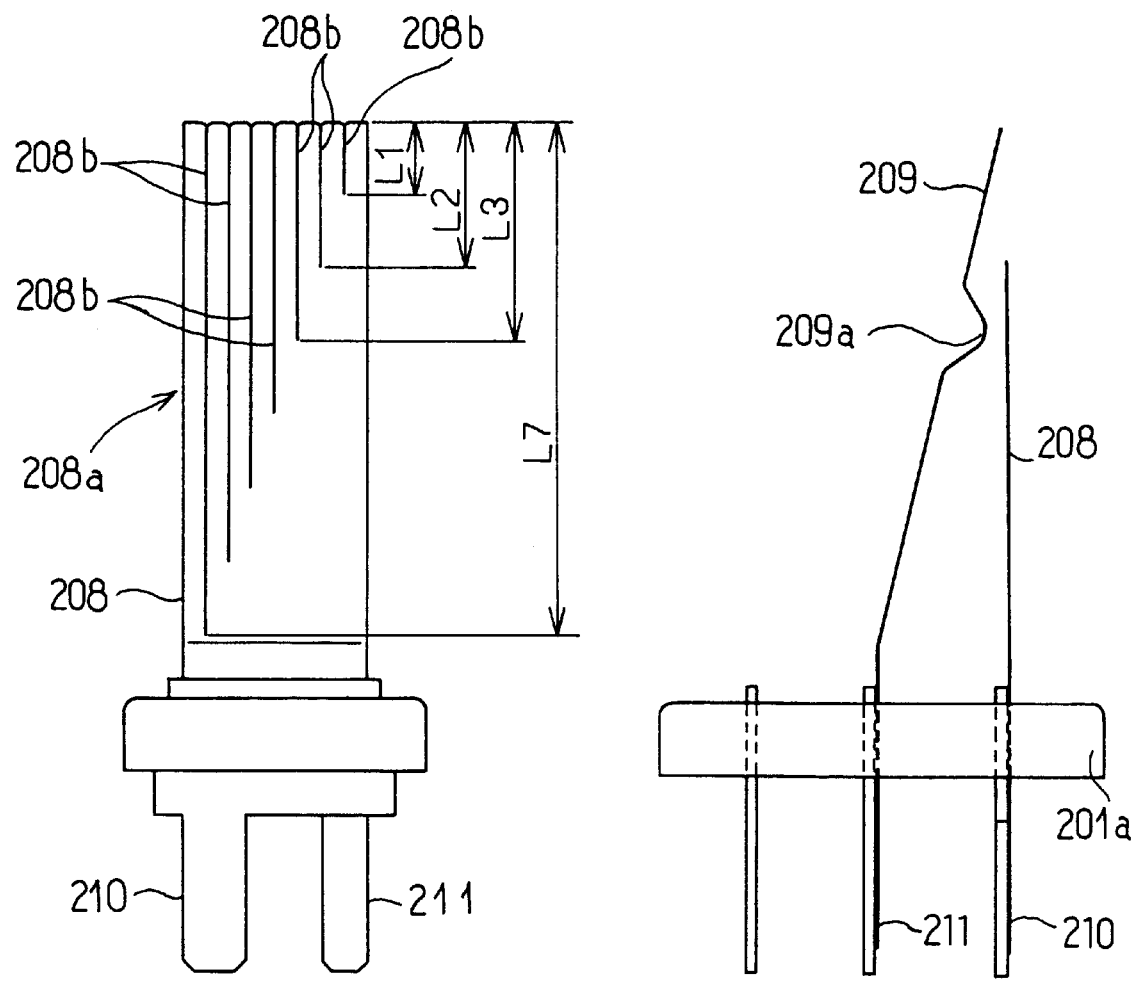
FIG. 27A is a front structural diagram indicating plate springs installed on a base.
FIG. 27B is a left-hand structural diagram indicating the plate springs.

A fourteenth embodiment according to the present invention will be described next with reference to FIG. 27.

An acceleration detecting device according to the present embodiment is characterized forming a plurality of slits on one plate spring.

FIGS. 27A and 27B are an explanatory drawing of plate springs formed on a base 201*a* by insert formation; FIG. 27A is a front view thereof, and FIG. 27B is a left-hand view of a plate spring 208.

As shown in FIG. 27B, seven slits 208*b* of differing length running from an upper end to the base 201*a* are formed on a contact-point portion 208*a* of the plate spring 208 by stamping or wire-cutting, assuming a form of division into a plurality of plate springs of differing length. The slits 208*b* become longer moving from the right-hand edge to the left-hand edge of the drawing, and according to the present embodiment, length L1 of the shortest slit is 3 mm (L2=4 mm and L5=5 mm), length L7 of the longest slit is 9 mm, and the width of each slit 8*b* is 0.1 mm. The plate spring 208 width is 2.4 mm and height is 10 mm.

As an incidental comment, the characteristic vibration frequency of a plate spring differs according to the spring length thereof, and so a plurality of plate springs of differing characteristic vibration frequency have come to be formed on the plate spring 208.

Accordingly, in a case where the plate spring 208 has vibrated due to shock generated by collision of the weight 206 on the cover 202, the divided several plate springs have respectively differing characteristic vibration frequencies, and there exist plate springs which resonate and plate springs which do not resonate according to the vibration thereof. That is to say, resonating plate springs separate from the contact-point portion, but plate springs which do not resonate do not separate from the contact-point portion, and so conductance of the contact-point portion is maintained.

Consequently, a stabilized acceleration-detection signal can be output.

It is also acceptable to form a plurality of slits on the plate spring 209, and the plate springs 208 and 209 may be mechanically fixed to the base 201a by riveting or the like. Additionally, it is also possible to vary the characteristic vibration frequency of the several plate springs by causing the respective thicknesses of the several separated plate springs to differ.

In addition, materials forming the housing 201, shaft 204, rotor 207, plate springs 208 and 209, terminals 210 and 211, and so on are not exclusively limited to those of the above-described embodiment.

According to the present embodiment, as described above, separation of the contact-point portions can be prevented by causing shock force generated by collision of the rotor 207 to be reduced, and so a stabilized acceleration-detection signal can be output with no interruption.

An acceleration detecting device of a fifteenth embodiment according to the present invention will be described next.

Figure 28:
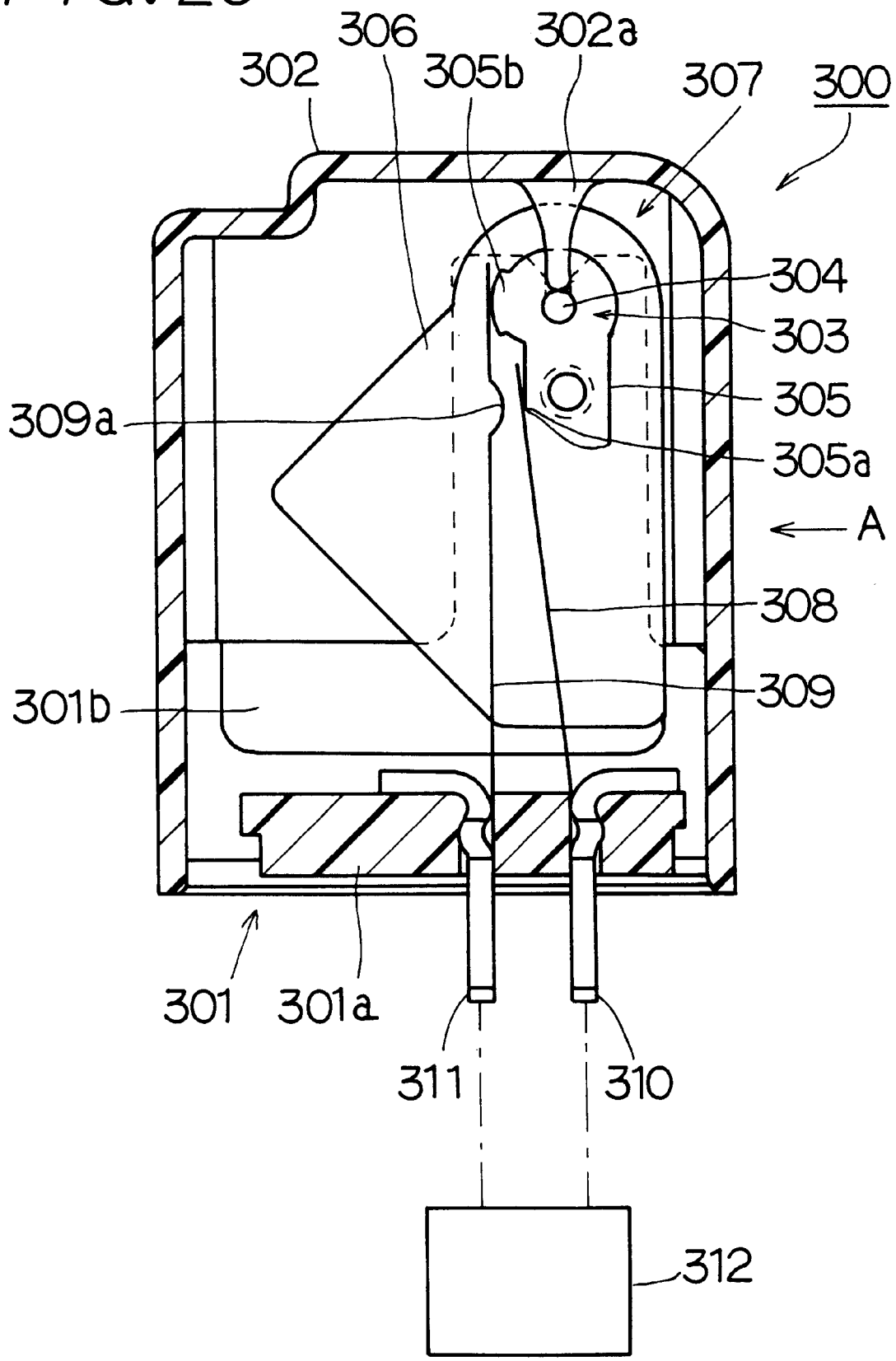
FIG. 28 is a front view indicating a structure of an acceleration detecting device according to a fifteenth embodiment.
Figure 29:
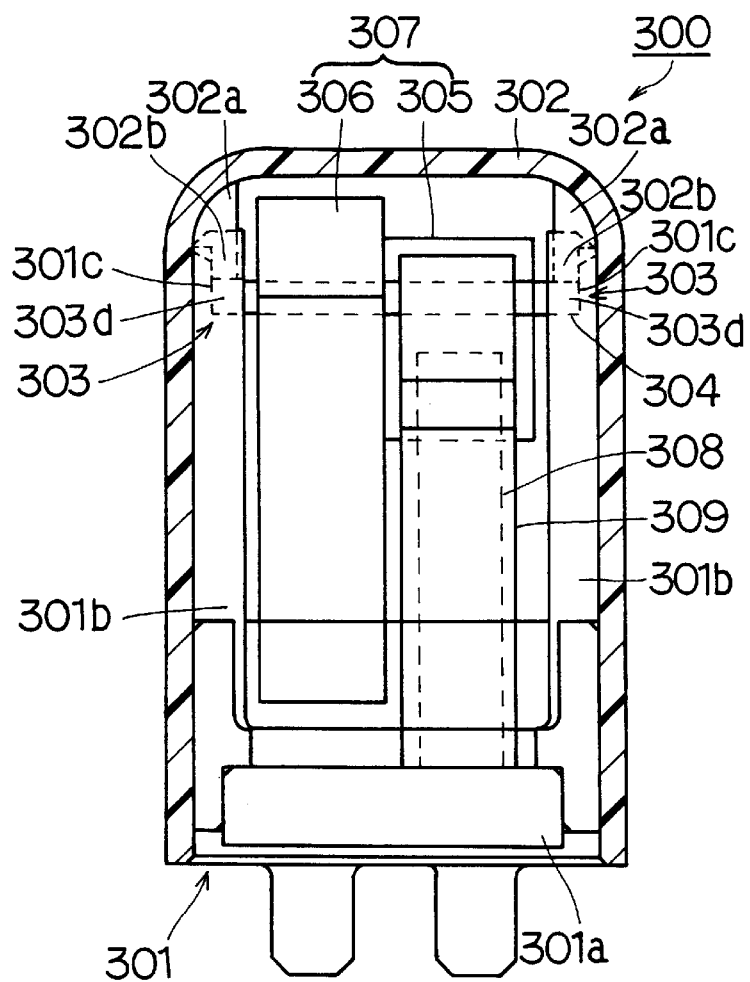
FIG. 29 is a left-hand structural diagram indicating a structure of an acceleration detecting device according to the fifteenth embodiment.

FIG. 28 is a front structural diagram of an acceleration detecting device 300 according to a fifteenth embodiment and FIG. 29 is a left-hand structural diagram thereof.

Firstly, structure of a housing 301 will be described.

The housing 301 is structured of a base 301a and two side plates 301b respectively formed perpendicularly to an upper surface of the base 301a at mutually opposing side edges of the base 301a. The base 301a and two side plates 301b are formed of PBT (polybutylene terephthalate). The base 301a has a width of 14 mm, a depth of 10 mm, and a thickness of 2.5 mm, and the side plates 301b have a width of 14 mm, a height of 22 mm, and a thickness of 2.5 mm. The entirety of the housing 301 is covered by a cover 302 of PBT fabrication.

Structure of bearing portions 303 will be described next.

Groove-shaped bearing portions 303 are disposed respectively on upper ends of the two side plates 301b, and two end portions of a shaft 304 are supported respectively on these bearing portions 303. As shown in the enlarged view of a bearing portion of FIG. 30, a Y-shaped (i.e., the head configuration of a plate screw) press-fitting path 303a is formed on the bearing portions 303 from an upper-end portion of the side plate 301b toward the base 301a. The press-fitting path 303a is formed into a bottomed (an inner surface of the side plate 301b corresponding to a bottom) groove configuration, and is composed of an open portion 303b of a side on which the shaft 304 is press-fitted, a narrow-diameter portion 303c, and a support portion 303d of circular configuration. According to the present embodiment, maximum open width L1 of the open portion 303b is 2 mm, width L2 of the narrow-diameter portion 303c is 0.8 mm, and diameter φ of the support portion 303d is 1 mm.

Because the width L2 of the narrow-diameter portion 303c is formed to be shorter than the diameter φ of the shaft 304 in this way, the narrow-diameter portion 303c is expanded by elastic deformation of the PBT to the outer side (i.e., the direction of expanding the open portion 303b) when the shaft 304 is press-fitted, and is restored to its original position when the shaft 304 is housed in the support portion 303d. That is to say, in a state where the shaft 304 is housed in the support portion 303d, the width L2 of the narrow-diameter portion 303c is shorter than the diameter φ of the shaft 304 (L2<φ), and so dislodgement of the shaft 304 from the narrow-diameter portion 303c can be prevented.

As an incidental comment, when the two ends of the shaft 304 are merely press-fitted respectively from the upper end portions of the two side plates 301b, the side plates 301b are of synthetic resin fabrication, and so the shaft 304 can not prevent the side plates 301b from falling in to an inner side due to contraction of the cooling process after molding and the end surfaces of the rotor 307 and the side plates 301b come into contact, and so compactness of the device cannot be promoted because the gap between the end surfaces of the rotor 307 and the side plates 301b must be large.

Figure 30:
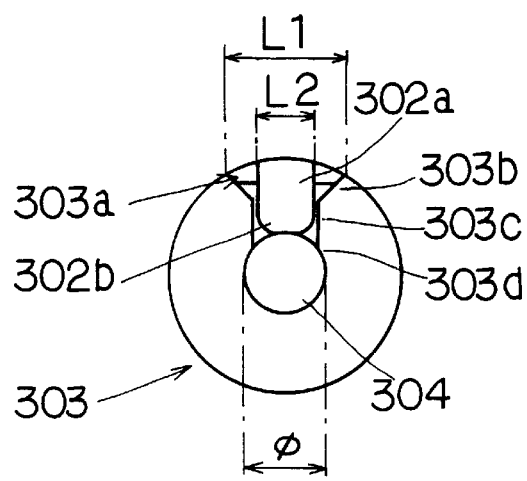
FIG. 30 is an enlarged view of a bearing portion.

In this regard, as shown in FIG. 29, this acceleration detecting device 300 prevents fall-in toward inner sides of the side plates 301b by causing the two ends of the shaft 304 to respectively contact bottom surfaces (inner surfaces of the side plates 301b in the axial direction) 301c within the support portions 303d (see FIG. 30).

Consequently, because distance of the gap between the side plates 301b and the rotor 307 can be adjusted by overall length of the shaft 304, the shaft 304 can make the gap between the side plates 301d and rotor 307 smaller, and so compactness of the device can be promoted. Strength of the device can also be improved.

According to experimentation by the inventors, the distance of the gap was reduced to a limit of 0.1 mm when the two ends of the shaft 304 were merely supported, but by utilization of the above-described structure, the distance of the gap can be reduced to 0.05 mm in a state where the side plates 301b and the rotor 307 do not make contact, and so further compactness of the device was possible.

Additionally, dislodgement-preventing members 302a of convex configuration are formed at positions corresponding to the respective bearing portions 303 of a rear surface of the cover 302 upper surface. Tip portions 302b of these dislodgement-preventing members 302a are inserted within the narrow-diameter portions 303c of the bearing portions 303 and contact an upper surface of the shaft 304, and dislodgement to an upper area of the shaft 304 is promoted thereby. According to the present embodiment, the shaft 304 is a diameter of 1 mm and is formed of SUS 304 stainless steel. In addition, the thickness (i.e., a width corresponding to L2 in FIG. 30) of the tip portions of the dislodgement-preventing members 302a is 0.7 mm according to the present embodiment.

Structure of the rotor 307 inserted and fixed to the shaft 304 will be described next.

The rotor 307 is structured by molding the cam 305 to the weight 306. The rotor 307 is structured so as to rotate in the clockwise direction in FIG. 28 with the shaft 304 as the rotational center when subjected to acceleration from the direction of arrow A in FIG. 28. According to the present embodiment, the rotor 307 is formed of copper, and the cam 305 is formed by molding PBT on the surface of the copper.

A pair of plate springs 308 and 309 are mounted on the base 301a of the housing 301 in a form where lower ends thereof are embedded within the base 301a. A uniform gap is placed between the two plate springs 308 and 309, one plate spring 308 contacts a first cam portion 305a of the cam 305, and the other plate spring 309 contacts a second cam portion 305b. A contact point 309a of convex configuration is flexibly formed on the plate spring 309. The two plate springs 308 and 309 respectively contact the cams 305a and 305b so as to urge the rotor 307 in a direction opposite (a counterclockwise direction in FIG. 28) to a direction of rotation during a vehicle collision, and are such that the rotor 307 does not rotate even if the vehicle decelerates during travel and slight acceleration is received.

Terminals 310 and 311 of copper fabrication and respectively conducted with the plate springs 308 and 309 are also embedded in the portion of the base 301a where the plate springs 308 and 309 are embedded. These terminals 310 and 311 are conducted to outside the base 301a, and are connected to a drive circuit 312 to drive a passenger protection apparatus.

Operation of an acceleration detecting device of the above-described structure will be described next.

When the acceleration detecting device 300 is subjected to acceleration (shock) from the direction indicated by arrow A in FIG. 28, the rotor 307 rotates in the clockwise direction in the drawing due to the law of inertia. The first cam portion 305a of the cam 305 lowers the plate spring 308 in the direction of the plate spring 309 due to this rotation, and the tip of the plate spring 308 contacts the contact point 309a of the plate spring 309. The plate springs 308 and 309 are electrically conducted by this contact, this conductance is detected by the drive circuit 312 via the terminals 310 and 311, and the drive circuit 312 is driven.

Materials forming the housing 301, shaft 304, rotor 307, plate springs 308 and 309, terminals 310 and 311, and so on are not exclusively limited to those of the above-described embodiment.

According to this acceleration detecting device 300, as described above, because a shaft which becomes a rotational center of the rotor 307 does not jiggle, accuracy of detecting acceleration can be improved and a gap between a side plates 301b and the rotor 307 can be made smaller, and so compactness of the device can be promoted.

What is claimed is:

1. An acceleration detecting device comprising:
    a weight to rotate in correspondence with acceleration;
    a shaft which is fixed to said weight and becomes a rotational center when said weight rotates;
    a rotor which includes a cam portion and which rotates integrally with said weight;
    a pair of plate springs disposed with a predetermined gap interposed therebetween, said pair of plate springs including a first plate spring and a second plate spring, said first plate spring and said second plate spring having respective tip portions, where said tip portion of said first plate spring contacts said cam portion of said rotor for urging said rotor in a direction opposite to a direction of rotation of said rotor, said cam portion being for moving said first plate spring towards said second plate spring when said rotor rotates to make said first plate spring contact said second plate spring; and
    first and second connection terminals to which said first and second plate springs are respectively connected is, said first and second connection terminals being for generating a first electrical signal indicative of contact of said first plate spring with said second plate spring.

2. An acceleration detecting device according to claim 1, wherein said cam portion of said rotor has a shape that reduces an amount of movement of said first plate spring with respect to an amount of rotation of said rotor as said rotor rotates.

3. An acceleration detecting device according to claim 1, wherein said cam portion of said rotor includes a first cam portion and a second cam portion, and said first and said second plate springs respectively contact said first cam portion and said second cam portion.

4. An acceleration detecting device according to claim 1, further comprising:
    an additional pair of plate springs and additional connection terminals connected thereto, said additional connection terminals being for generating a second electrical signal independent of said first electrical signal.

5. An acceleration detecting device according to claim 4, wherein said pairs of plate springs are disposed on two both sides of said weight.

6. An acceleration detecting device according to claim 1, wherein said tip portion of at least one said of said first plate spring and said second plate spring includes a slit.

7. An acceleration detecting device according to claim 1, further comprising:
    a housing to fix said shaft and said plate springs; and
    a cover installed on said housing by mating so as to cover said shaft and said plate springs fixed to said housing wherein:
        a mating portion of at least one of said housing and said cover is provided with a first mating portion whereby said cover and said housing mate loosely in an initial stage when said cover and said housing are mated, and a second mating portion whereby said cover and said housing mate tightly subsequently to said initial stage.

8. An acceleration detecting device according to claim 7, wherein said shaft is disposed proximate to a closed end of said cover, and
    said plate springs are disposed proximate to said mating portion of said cover with said housing.

9. An acceleration detecting device according to claim 1, further comprising:
    a housing to fix said shaft and said pair of plate springs;
    a cover installed on said housing so as to cover said shaft and said pair of plate springs fixed to said housing; and
    a shock-reducing member which is disposed on at least one of said housing and said cover and which acts on said weight rotating further after said first plate spring makes contact with said second plate spring to reduce a rotation moment of said weight.

10. An acceleration detecting device according to claim 9, wherein said shock-reducing member is an elastic plate-shaped member that is formed integrally with said housing.

11. An acceleration detecting device according to claim 9, wherein said shaft is disposed proximate to a closed end of said cover, and
    said plate springs are disposed proximate to an opening of said cover.

12. An acceleration detecting device according to claim 1, wherein said tip portion of at least one of said first and said second plate springs includes a plurality of slits of differing length.

13. An acceleration detecting device according to claim 1, further comprising:
    a housing for accommodating said shaft and said plate springs; and
    bearings for supporting both ends of said shaft.

14. An acceleration detecting device according to claim 1, wherein said first plate spring has a substantially linear shape.

15. An acceleration detecting device according to claim 14, wherein said second plate spring has a curved portion that projects towards said first plate spring.

16. An acceleration detecting device according to claim 1, wherein said second plate spring has a curved portion that projects towards said first plate spring.

17. An acceleration detecting device comprising:

a weight to rotate in correspondence with acceleration;

a shaft which is fixed to said weight and becomes a rotational center when said weight rotates;

a rotor which includes a cam portion and which rotates integrally with said weight;

a pair of plate springs disposed with a predetermined gap interposed therebetween, said pair of plate springs including a first plate spring and a second plate spring, said first plate spring and said second plate spring having respective tip portions, where said tip portion of said first plate spring contacts said cam portion of said rotor for urging said rotor in a direction opposite to a direction of rotation of said rotor, said cam portion being for moving said first plate spring towards said second plate spring when said rotor rotates to make said first plate spring contact said second plate spring;

first and second connection terminals to which said first and second plate springs are respectively connected, said first and second connection terminals being for generating a first electrical signal indicative of contact of said first plate spring with said second plate spring;

a housing to fix said shaft and said plate springs; and an installation terminal which protrudes from an outer peripheral surface of said housing to fix said housing to a substrate, wherein:

said installation terminal passes through a hole provided on said substrate, said installation terminal having a wide contacting portion for making contact with a first surface of said substrate when said installation terminal has passed through said hole and a notch portion disposed between said first surface and an opposite second surface of said substrate when said contacting portion is in contact with said first surface of said substrate and a tip portion of said installation terminal is protruding from said second surface of said substrate, and said tip portion of said installation terminal bends along said second surface of said substrate from said notch portion to securely fix said housing to said substrate.

18. An acceleration detecting device according to claim 17, wherein said notch portion is formed adjacent to said contacting portion.

19. An acceleration detecting device comprising:

a weight to rotate in correspondence with acceleration;

a shaft which is fixed to said weight and becomes a rotational center when said weight rotates;

a rotor which includes a cam portion and which rotates integrally with said weight;

a pair of plate springs disposed with a predetermined gap interposed therebetween, said pair of plate springs including a first plate spring and a second plate spring, said first plate spring and said second plate spring having respective tip portions, where said tip portion of said first plate spring contacts said cam portion of said rotor for urging said rotor in a direction opposite to a direction of rotation of said rotor, said cam portion being for moving said first plate spring towards said second plate spring when said rotor rotates to make said first plate spring contact said second plate spring;

first and second connection terminals to which said first and second plate springs are respectively connected, said first and second connection terminals being for generating a first electrical signal indicative of contact of said first plate spring with said second plate spring; and a housing for accommodating said shaft and said plate springs;

bearings for supporting both ends of said shaft;

wherein a press-fitting path leading to a bearing position and into which said shaft is press-fitted is formed in each of said bearings, and a narrow-diameter portion having a diameter narrower than a diameter of said shaft is formed in said press-fitting path.

20. An acceleration detecting device comprising:

a weight to rotate in correspondence with acceleration;

a shaft which is fixed to said weight and becomes a rotational center when said weight rotates;

a rotor which includes a cam portion and which rotates integrally with said weight;

a pair of plate springs disposed with a predetermined gap interposed therebetween, said pair of plate springs including a first plate spring and a second plate spring, said first plate spring and said second plate spring having respective tip portions, where said tip portion of said first plate spring contacts said cam portion of said rotor for urging said rotor in a direction opposite to a direction of rotation of said rotor, said cam portion being for moving said first plate spring towards said second plate spring when said rotor rotates to make said first plate spring contact said second plate spring;

first and second connection terminals to which said first and second plate springs are respectively connected, said first and second connection terminals being for generating a first electrical signal indicative of contact of said first plate spring with said second plate spring;

a housing for accommodating said shaft and said plate springs;

bearings for supporting both ends of said shaft; and a dislodgment-preventing member inserted into said press-fitting path to prevent dislodgment of said shaft.

21. An acceleration detecting device comprising:

a weight to rotate in correspondence with acceleration;

a shaft which is fixed to said weight and becomes a rotational center when said weight rotates;

a rotor which includes a cam portion and which rotates integrally with said weight;

a pair of plate springs disposed with a predetermined gap interposed therebetween, said pair of plate springs including a first plate spring and a second plate spring, said first plate spring and said second plate spring having respective tip portions, where said tip portion of said first plate spring contacts said cam portion of said rotor for urging said rotor in a direction opposite to a direction of rotation of said rotor, said cam portion being for moving said first plate spring towards said second plate spring when said rotor rotates to make said first plate spring contact said second plate spring;

first and second connection terminals to which said first and second plate springs are respectively connected, said first and second connection terminals being for generating a first electrical signal indicative of contact of said first plate spring with said second plate spring;

a housing for accommodating said shaft and said plate springs; and bearings for supporting both ends of said shaft;

wherein said bearings are groove portions formed in said housing, and two ends of said shaft contact bottom surfaces of said groove portions.

* * * * *